United States Patent
Kim et al.

(10) Patent No.: US 8,230,180 B2
(45) Date of Patent: Jul. 24, 2012

(54) SHARED MEMORY BURST COMMUNICATIONS

(75) Inventors: Young Lak Kim, Anyang-si (KR); Im Bum Oh, Seoul (KR); Kyoung Heon Jeong, Suwon-si (KR); Young Eun Park, Suwon-si (KR); Chul Min Jo, Seoul (KR); Sang Hyun Lee, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 861 days.

(21) Appl. No.: 12/336,039

(22) Filed: Dec. 16, 2008

(65) Prior Publication Data
US 2009/0313440 A1  Dec. 17, 2009

(30) Foreign Application Priority Data

Jun. 11, 2008 (KR) .................. 10-2008-0054432
Aug. 4, 2008 (KR) .................. 10-2008-0076129

(51) Int. Cl.
*G06F 12/00* (2006.01)
(52) U.S. Cl. ........ 711/147; 711/148; 711/149; 711/150; 711/156; 711/E12.039
(58) Field of Classification Search .................. None
See application file for complete search history.

(56) References Cited

U.S. PATENT DOCUMENTS

| | | | | |
|---|---|---|---|---|
| 5,136,691 A | * | 8/1992 | Baror | 711/139 |
| 2001/0037410 A1 | * | 11/2001 | Gardner | 709/313 |
| 2007/0052723 A1 | * | 3/2007 | Subramanian et al. | 345/619 |
| 2007/0234021 A1 | * | 10/2007 | Ruberg et al. | 712/244 |

FOREIGN PATENT DOCUMENTS

| | | |
|---|---|---|
| JP | 04-229486 | 8/1992 |
| JP | 06004487 | 1/1994 |
| JP | 08-339357 | 12/1996 |
| KR | 1020000020002 | 4/2000 |
| KR | 1020030055416 | 7/2003 |
| KR | 10-0460108 | 11/2004 |
| KR | 100725099 | 5/2007 |
| WO | 2007050363 | 5/2007 |

\* cited by examiner

*Primary Examiner* — Yaima Campos
*Assistant Examiner* — Thanh D Vo
(74) *Attorney, Agent, or Firm* — F. Chau & Associates, LLC

(57) ABSTRACT

A method and apparatus are provided for sharing multipath-accessible memory between a plurality of processors, the method including connecting the plurality of processors in read/write communication to a same shared memory region; connecting the plurality of processors in read communication to a same semaphore area; selectably connecting one of the plurality of processors in write communication to the same semaphore area; exchanging shared memory access command messages between two processors for negotiating access to the same shared memory region; and storing protected variables indicative of the currently negotiated access to the same shared memory region in the same semaphore area, wherein the shared memory region has a channel relative to each processor, each channel having at least one buffer disposed for transferring a plurality of data packets in a burst mode.

22 Claims, 31 Drawing Sheets

FIG. 4

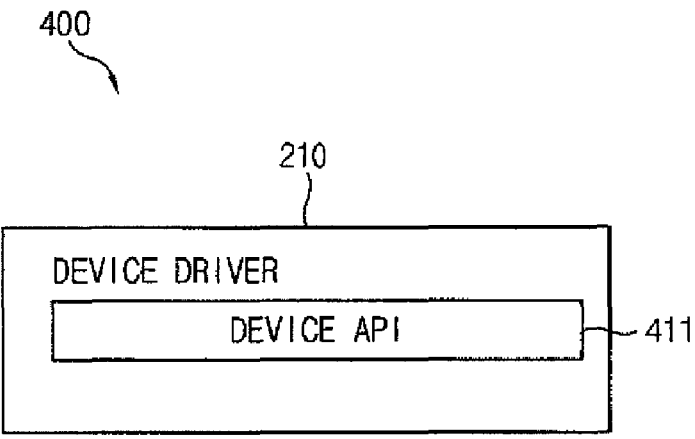

| CATEGORY | FUNCTION NAME | DESCRIPTION |
|---|---|---|
| COMMAND | WRITECOMMAND | WRITE COMMAND/MESSAGE TO MAILBOX |
| | READCOMMAND | READ COMMAND/MESSAGE FROM MAILBOX |
| DATA | WRITEDATA | WRITE DATA TO SHARED BANK |
| | READDATA | READ DATA FROM SHARED BANK |
| MISCELLANEOUS | INIT | INITIALIZE DEVICE DRIVER |
| | CHECKOWNERSHIP | CHECK OWNERSHIP OF SHARED BANK |
| | GETLASTERROR | RETRIEVE ERROR CODE |
| | GETCHADDR | RETRIEVE ADDRESS OF CHANNEL |

| CATEGORY | FUNCTION NAME | DESCRIPTION |
|---|---|---|
| DATA | IPCSEND | SEND DATA PACKET |
| | IPCRECEIVE | RECEIVE DATA PACKET |
| MISCELLANEOUS | IPCOPEN | OPEN IPC CHANNEL HANDLE |
| | IPCCLOSE | CLOSE IPC CHANNEL HANDLE |
| | IPCIOCTL | CONTROL SETTING OF IPC DRIVER |

| ITEM | SPEC. | |
|---|---|---|
| DENSITY | 512MB(64MB) DRAM CELL | |
| BANK CONFIGURATION | 4 BANKS (16MB/BANK) | |
| | ONE BANK FOR PORT-A 2 BANKS FOR PORT-B ONE SHARED BANK | |
| ACCESS CONTROL | BANK | |
| PORT | A-PORT | B-PORT |
| I/O WIDTH/ PORT | x16 | x16/x32 |
| MODE (DATA RATE) | SDR | SDR/DDR |
| MAIN CLOCK FREQUENCY | 66/100/ 133MHz | 100/133 133MHz |
| PORT OPERATION | INDEPENDENT | |

SHARED MEMORY BURST COMMUNICATIONS

CROSS-REFERENCE TO RELATED APPLICATION

This application claims foreign priority under 35 U.S.C. §119 to Korean Patent Application No. P2008-0054432, filed on Jun. 11, 2008, in the Korean Intellectual Property Office, the disclosure of which is incorporated by reference herein in its entirety, and to Korean Patent Application No. P2008-0076129, filed on Aug. 4, 2008, in the Korean Intellectual Property Office, the disclosure of which is incorporated by reference herein in its entirety.

BACKGROUND OF THE INVENTION

The present disclosure generally relates to semiconductor memory devices. More particularly, the present disclosure relates to a method of driving a multipath-accessible shared bank memory device for low-level burst communications.

A semiconductor memory device having more than one access port may be called a multiport memory. In particular, a memory device having two access ports may be called a dual-port memory. A conventional dual-port memory is known in the art. For example, a conventional dual-port memory may be used as an image processing video memory. The conventional dual-port memory has one random access memory (RAM) port accessible in a random sequence and one serial access memory (SAM) port accessible only in a serial sequence, and is commonly known as dual-port RAM (DPRAM).

Another type of multiport memory includes an array of memory cells, such as dynamic random access memory (DRAM) cells, which can be accessed randomly through two or more ports. This type of device is called a multipath-accessible memory. A multipath-accessible memory is distinguishable from a conventional multiport memory, in which only one of the two or more ports supported random access.

SUMMARY OF THE INVENTION

These and other issues are addressed by a method and apparatus for driving a multipath-accessible shared bank memory device for low-level burst communications. Exemplary embodiments are provided.

An exemplary embodiment provides a multipath-accessible memory device comprising a plurality of input/output ports, each disposed for connection to one of a plurality of processors; a shared memory region connected in read/write communication to each of the plurality of ports; a plurality of mailboxes, each connected in read communication to one of the plurality of ports for receiving shared memory access command messages from other processors; a semaphore area connected in read communication to each of the plurality of ports and connected in selectable write communication to one of the plurality of ports for storing protected variables indicative of the currently negotiated access to the shared memory region, wherein the shared memory region has at least one channel relative to each processor, the at least one channel having at least one buffer disposed for transferring a plurality of data packets in a burst mode.

Another exemplary embodiment provides a method of sharing multipath-accessible memory between a plurality of processors, the method comprising: connecting the plurality of processors in read/write communication to a same shared memory region; connecting the plurality of processors in read communication to a same semaphore area; selectably connecting one of the plurality of processors in write communication to the same semaphore area; exchanging shared memory access command messages between two processors for negotiating access to the same shared memory region; and storing protected variables indicative of the currently negotiated access to the same shared memory region in the same semaphore area, wherein the shared memory region has a channel relative to each processor, each channel having at least one buffer disposed for transferring a plurality of data packets in a burst mode.

Yet another exemplary embodiment provides a mobile communications device comprising: a plurality of processors; a plurality of input/output ports, each disposed for connection to one of the plurality of processors; a shared memory region connected in read/write communication to each of the plurality of ports; a plurality of mailboxes, each connected in read communication to one of the plurality of ports for receiving shared memory access command messages from other processors; a semaphore area connected in read communication to each of the plurality of ports and connected in selectable write communication to one of the plurality of ports for storing protected variables indicative of the currently negotiated access to the shared memory region, wherein the shared memory region has at least one channel relative to each processor, the at least one channel having at least one buffer disposed for transferring a plurality of data packets in a burst mode.

A further exemplary embodiment provides a mobile communications apparatus comprising: a first processor; at least one second processor; and a multipath-accessible memory configured to transfer a plurality of data packets between the first and at least one second processors; wherein the multipath-accessible memory is configured to be selectively accessed by the first or at least one second processors and to store command and data transit information for transferring the plurality of data packets between the processors.

The present disclosure will be further understood from the following description of exemplary embodiments, which is to be read in connection with the accompanying drawings.

BRIEF DESCRIPTION OF THE DRAWINGS

The present disclosure provides a method of driving a multipath-accessible shared bank memory device for low-level burst communications in accordance with the following exemplary figures, in which like reference numerals may be used to indicate like elements in the several figures, where:

FIG. 4 shows a schematic block diagram of an application programming interface (API) supported by the device drivers of FIGS. 2 and 3 in accordance with an exemplary embodiment of the present disclosure;

FIG. 5 shows a table of application programming interface (API) functions supported by the device drivers of FIGS. 2 and 3 in accordance with an exemplary embodiment of the present disclosure;

FIG. 25 shows a table for a OneDRAM™ specification, which is usable as the IPC device in accordance with exemplary embodiments of the present disclosure;

DETAILED DESCRIPTION OF PREFERRED EMBODIMENTS

The present disclosure provides a method of driving a multipath-accessible shared bank memory device for low-level burst communications. Exemplary embodiments will be described. A multipath-accessible shared bank memory device is disclosed in co-pending U.S. patent application Ser. No. 11/829,859, entitled "MULTIPATH ACCESSIBLE SEMICONDUCTOR MEMORY DEVICE WITH HOST INTERFACE BETWEEN PROCESSORS", filed Jul. 27, 2007, which is incorporated herein by reference in its entirety. A multipath-accessible shared bank memory device may comprise a OneDRAM™, for example, which is a fusion DRAM manufactured by Samsung Electronics Co., Ltd.

An exemplary multipath-accessible shared bank memory device includes at least one mailbox. The multipath-accessible shared bank memory device with mailbox may be disposed between a modem and a processor executing an application process (AP) to facilitate low-level burst communications. A device driver for the multipath-accessible shared bank memory device supports communications between the processor and the modem, which may be further connected to another modem or external communications device. The device driver supports a bi-directional burst mode with burst control between the processor and the modem.

Alternatively, the multipath-accessible shared bank memory device may be disposed between two or more processors in a multiprocessor system to facilitate smooth access to at least one shared bank of the memory device by the multiple processors. A device driver for the multipath-accessible memory device supports inter-processor communications. The device driver supports a multi-directional burst mode with burst control between the multiple processors.

Figure 1:
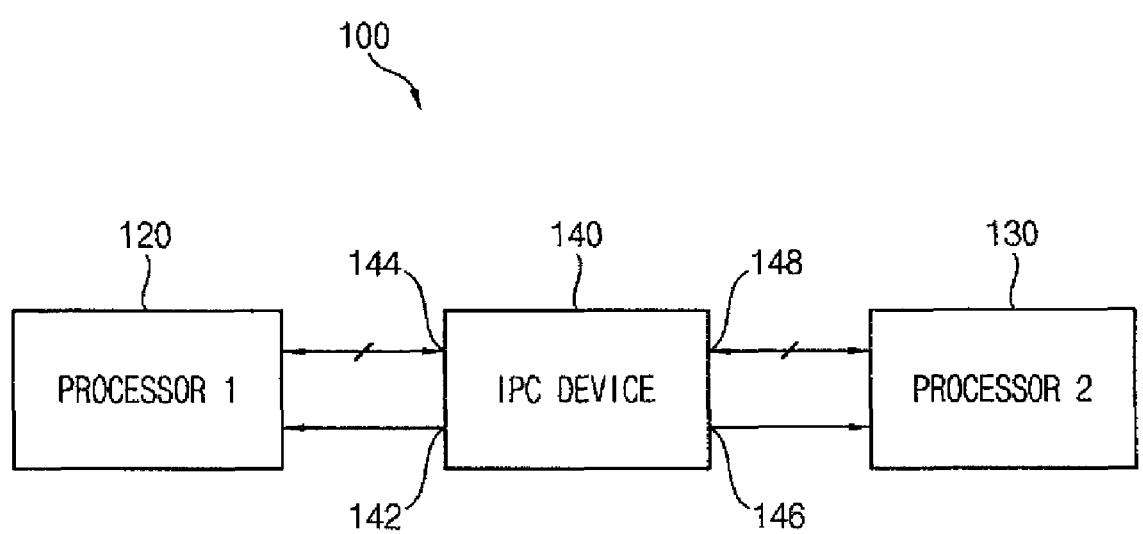
FIG. 1 shows a schematic block diagram of a multiprocessor system with two processors and an inter-processor communications (IPC) device in accordance with an exemplary embodiment of the present disclosure.

As shown in FIG. 1, a multiprocessor system is generally indicated by the reference numeral 100. The system 100 includes a first processor 120 in signal communication with an inter-processor communications (IPC) device 140. The IPC device 140 comprises a multipath-accessible shared bank memory device. The system 100 further includes a second processor 130 in signal communication with the IPC device 140. The IPC device 140 has a first outgoing interrupt port 142 and a first bi-directional data port 144, each in signal communication with the first processor 120. In addition, the IPC device 140 has a second outgoing interrupt port 146 and a bi-directional data port 148, each in signal communication with the second processor 130.

Figure 2:
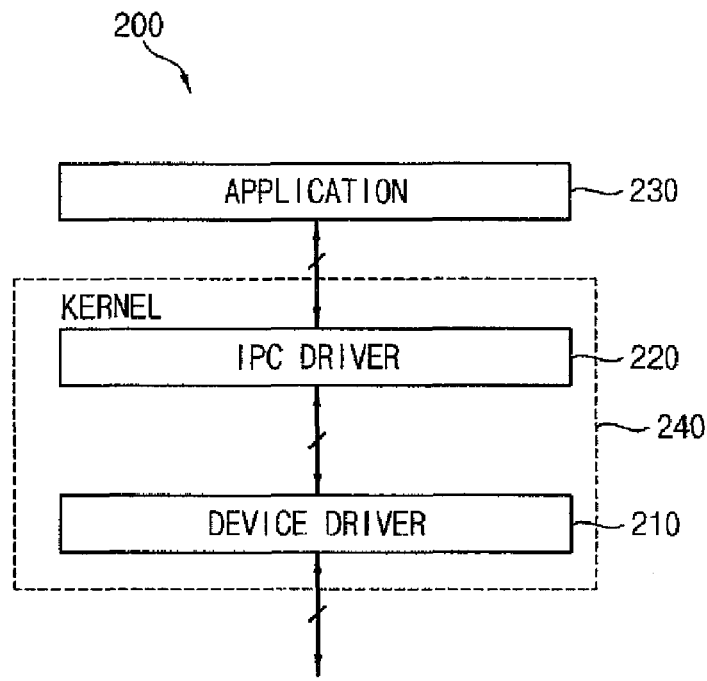
FIG. 2 shows a schematic block diagram of a memory device having an application module, an inter-processor communications (IPC) driver module and a device driver module, each executable by the processors of FIG. 1 in accordance with an exemplary embodiment of the present disclosure.

Turning to FIG. 2, a computer-readable memory device is indicated generally by the reference numeral 200. The device 200 includes an application module 230 in signal communication with a kernel 240. The kernel 240 includes an inter-processor communications (IPC) driver 220 in signal communication with the application module 230 and a device driver 210. The drivers 210 and 220 and the application 230 are executable by the processor 120 of FIG. 1.

Figure 3:
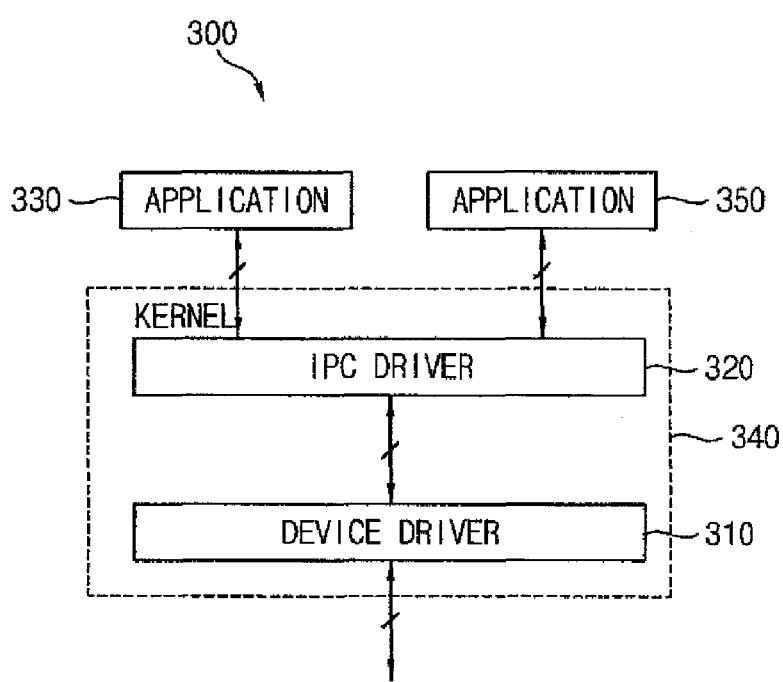
FIG. 3 shows a schematic block diagram of a memory device having two multi-threaded application modules executable by the processors of FIG. 1 in accordance with an exemplary embodiment of the present disclosure.

Turning now to FIG. 3, another computer-readable memory device is indicated generally by the reference numeral 300. The device 300 includes a first multi-threaded application module 330 and a second multi-threaded application module 350, each in signal communication with a kernel 340. The kernel 340 includes an inter-processor communications (IPC) driver 320 in signal communication with the application modules 330 and 350, and further in signal communication with a device driver 310. The drivers 310 and 320 and the applications 330 and 350 are executable by the processor 130 of FIG. 1.

As shown in FIG. 4, an application programming interface (API) is indicated generally by the reference numeral 400. The API 400 comprises the device drivers 210 and 310 of FIGS. 2 and 3, respectively, and a device API 411.

Turning to FIG. 5, application programming interface (API) functions are generally indicated by the reference numeral 500. The API functions include command functions, data functions and miscellaneous functions. The command functions include a WriteCommand function to write a command or message to a mailbox, and a ReadCommand function to read a command or message from a mailbox. The data functions include a WriteData function to write data to a shared bank, and a ReadData function to read data from a shared bank. The miscellaneous functions include an Init function to initialize a device driver, a CheckOwnership function to check the current ownership of a shared bank, a GetLastError function to retrieve the last error code, and a GetChaAddr to retrieve an address of a channel. These functions are each supported by the device drivers 210 and 310 of FIGS. 2 and 3, respectively.

Figures 6, 7:
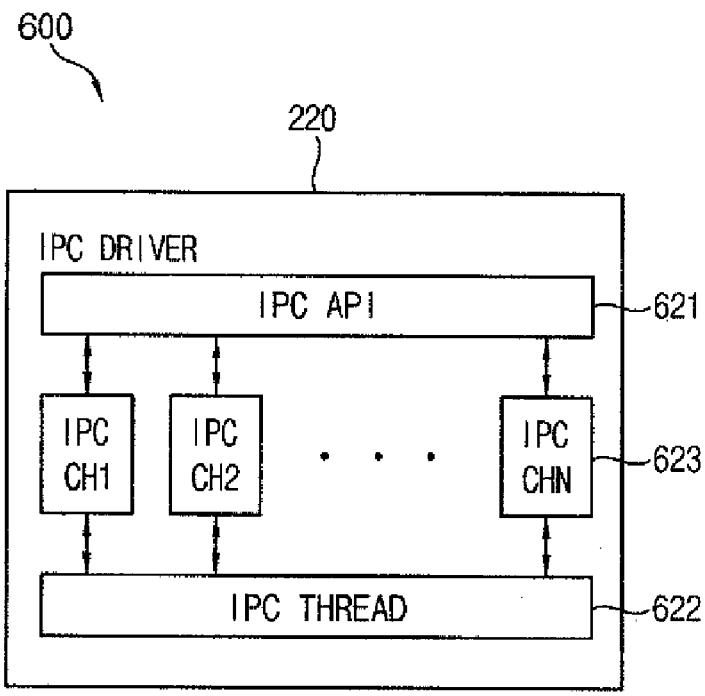
FIG. 6 shows a schematic block diagram of an application programming interface (API) supported by the inter-processor communications (IPC) drivers of FIGS. 2 and 3 in accordance with an exemplary embodiment of the present disclosure.
FIG. 7 shows a table of application programming interface (API) functions supported by the inter-processor communications (IPC) drivers of FIGS. 2 and 3 in accordance with an exemplary embodiment of the present disclosure.

Turning now to FIG. 6, a driver with application programming interface (API) is generally indicated by the reference numeral 600. The driver 600 comprises the IPC driver 220 of FIGS. 2 and 3. Here, the IPC driver includes an IPC API 621, a plurality N of IPC channels 623 in signal communication with the IPC API, and an IPC thread 622 in signal communication with the IPC channels. Thus, the IPC API 621 is supported by the IPC drivers 220 and 320 of FIGS. 2 and 3, respectively. While one IPC channel 623 may be sufficient for exemplary applications, multiple channels may be provided for the convenience of user applications, since they may help to keep data in context Thus, the data packets include a channel number in embodiments having more than one channel.

As shown in FIG. 7, application programming interface (API) functions are generally indicated by the reference numeral 700. These API functions are supported by the inter-processor communications (I PC) drivers 220 and 320 of FIGS. 2 and 3, respectively. The IPC API commands include data functions and miscellaneous functions. The data functions include an IPCSend function to send a data packet, and an IPCReceive function to receive a data packet. The miscellaneous functions include an IPCOpen function to open an IPC channel handle, an IPCClose function to close an IPC channel handle, and an IPCIOCntl function to control settings of the IPC driver. For example, when an IPC channel status is closed, no more reads or writes are permitted.

Figure 8:
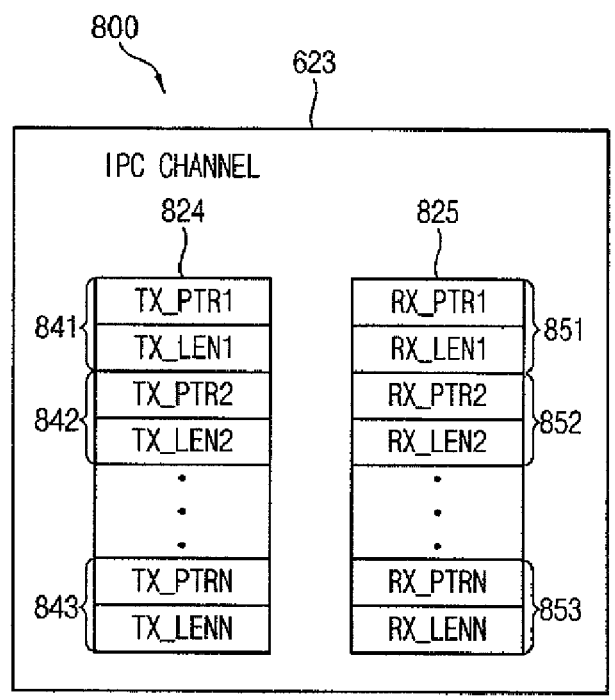
FIG. 8 shows a schematic block diagram of exemplary inter-processor communications (IPC) channels supported by the IPC driver of FIG. 6 in accordance with an exemplary embodiment of the present disclosure.

Turning to FIG. 8, an exemplary inter-processor communications (IPC) channel is indicated generally by the reference numeral 800. The IPC channel 800 is supported by the IPC driver 220 of FIGS. 2, 3 and 6, and comprises one of the plurality of channels 623 of FIG. 6. The IPC channel 800 includes a transmit side 824 and a receive side 825. The transmit side 824 includes a plurality M of transmit packets 841, 842 . . . 843. Each transmit packet includes a transmit packet pointer TX_PTR and a transmit packet length TX_LEN. The receive side 825 includes a plurality N of receive packets 851, 852 . . . 853. Each receive packet includes a receive packet pointer RX_PTR and a receive packet length RX_LEN.

Figure 9:
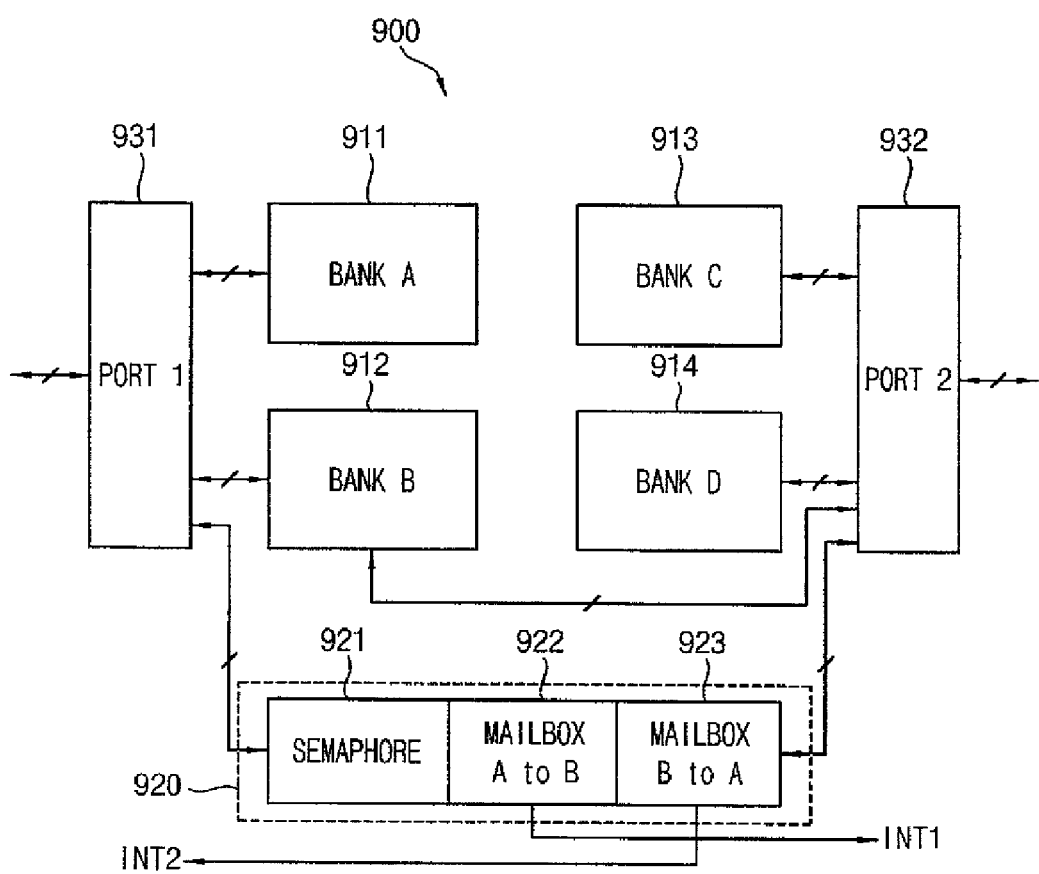
FIG. 9 shows a schematic block diagram of the inter-processor communications (IPC) device of FIG. 1 in accordance with an exemplary embodiment of the present disclosure.

Turning now to FIG. 9, an inter-processor communications (IPC) device 140 of FIG. 1 is indicated generally in greater detail by the reference numeral 900. The IPC device 900 includes a plurality of ports 931-932 in signal communication with at least one bank 911-914, and a semaphore/mailbox area 920. Here, a first bi-directional data port 931 and a second bi-directional data port 932 are both in bi-directional signal communication with at least one dual-port bank 912. Optional banks 911, 913 and 914 are in bi-directional signal communication with one or more of the ports. In this example, the bank 911 is connected to the first port 931, while the banks 913 and 914 are connected to the second port 932. The banks 911, 912, 913 and 914 may be implemented in dynamic random access memory (DRAM) cells, for example.

The semaphore/mailbox area 920 is in bi-directional signal communication with each of the ports, and includes a semaphore area 921, a MailboxAtoB area for messages from a processor connected to the first port to a processor connected to the second port, and a MailboxBtoA area for messages from the processor connected to the second port to the processor connected to the first port. The MailboxAtoB area includes a first interrupt INT1 from the processor connected to the first port to the processor connected to the second port, and the MailboxBtoA area includes a second interrupt INT2 from the processor connected to the second port to the processor connected to the first port. The semaphore area 921 defines the current ownership of the shared bank. For embodiments with two ports, the semaphore may be just one bit, for example. Only the processor that is the current owner can write or change the semaphore.

For ease of explanation, the IPC device 900 includes just one dual-port bank 912, one semaphore bit 921, two RAM ports 931 and 932, and two mailboxes 922 and 923, but alternate embodiments having a greater number of RAM ports, dual-port banks, semaphore bits, and/or mailboxes are contemplated. For example, an alternate embodiment with N ports may have up to $N(N-1)/2$ dual-port banks, up to $N(N-1)/2$ semaphore bits and up to $N(N-1)$ mailboxes. Thus, a fully versatile three-port embodiment might have three dual-port port banks, three semaphore bits and six mailboxes; while a fully versatile four-port embodiment might have six dual-port banks, six semaphore bits and twelve mailboxes.

On the other hand, reduced versatility embodiments, where all processors need not communicate in burst mode with every other processor, are also contemplated. For example, an eight-port embodiment for which four pairs of processors need to communicate within the pair, but not with processors of the other three pairs, might include four dual-port banks, four semaphore bits, the four RAM ports, and eight mailboxes.

Figure 10:
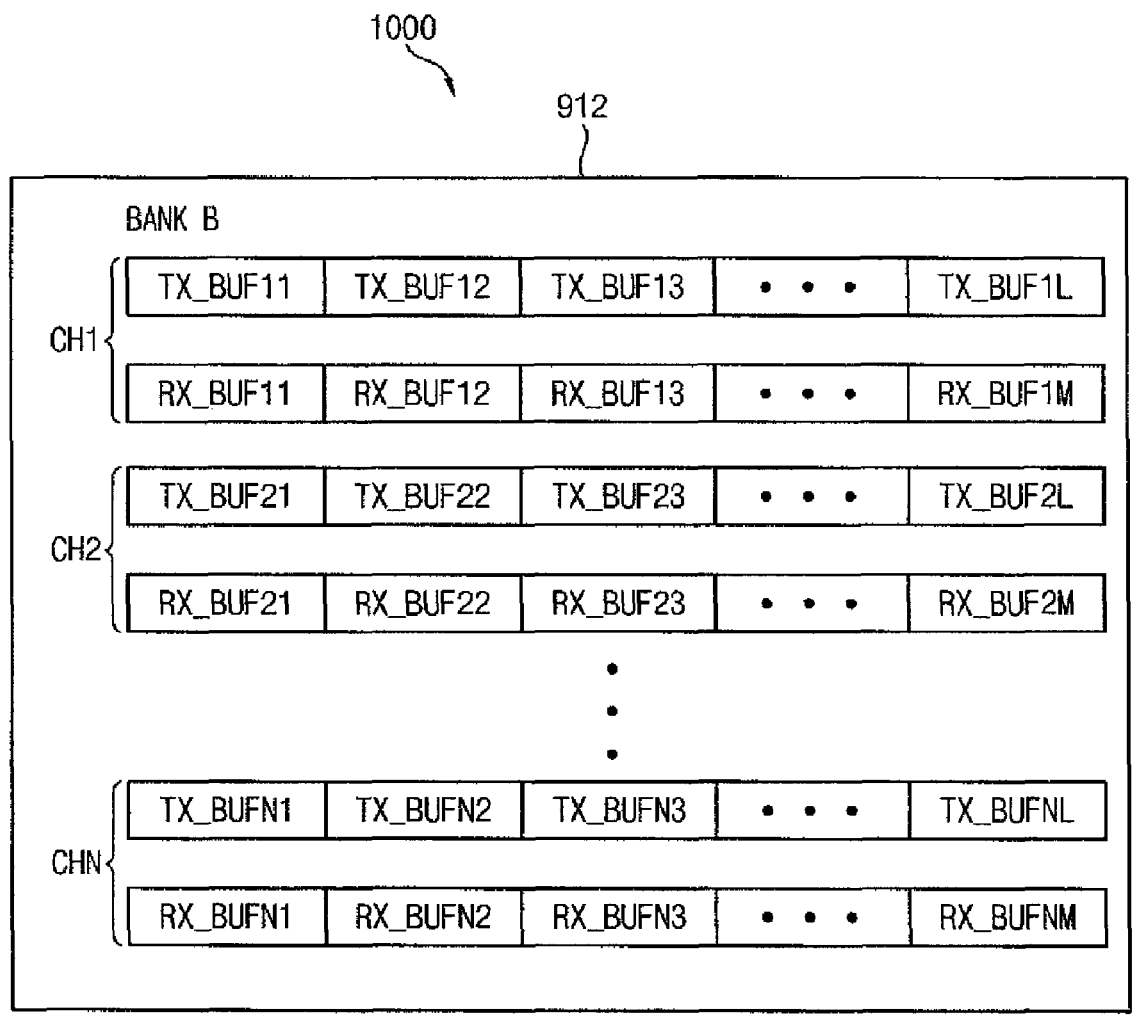
FIG. 10 shows a schematic block diagram of a bank or shared storage region of FIG. 9 in accordance with an exemplary embodiment of the present disclosure.

As shown in FIG. 10, a shared storage region or bank is indicated generally by the reference numeral 1000. The bank or shared storage region 1000 may be any dual-port bank, such as the dual-port bank 912 of FIG. 9. The bank 1000 includes a plurality N of channels CH1-CHN, each channel including a plurality L of transmit buffers TX_BUF and a plurality M of receive buffers RX_BUF.

Figure 11:
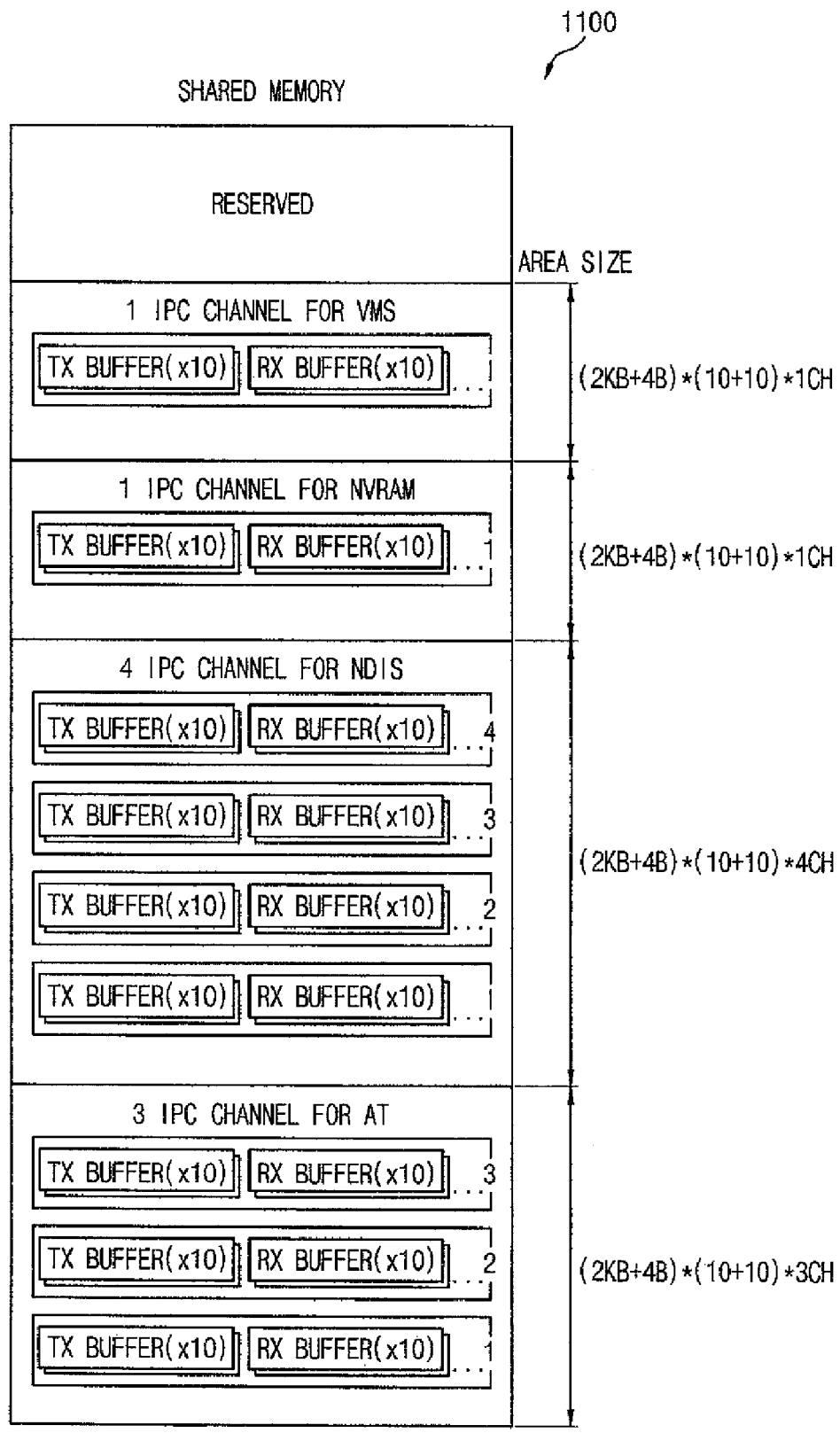
FIG. 11 shows a schematic block diagram of a shared memory bank with inter-processor communications (IPC) channels for a processor to modem in accordance with an exemplary embodiment of the present disclosure.

Turning to FIG. 11, another shared memory or bank is indicated generally by the reference numeral 1100. The bank 1100 supports a modem embodiment of the present disclosure by providing one IPC channel for a voice mail service (VMS), one IPC channel for a modem database in non-volatile random access memory (NVRAM), four IPC channels for network data service packets (NDIS), and three IPC channels for modem commands (AT). Here, each channel has ten transmit buffers and ten receive buffers, and uses a memory area of (2 KB+4 B)*(10+10) bytes In alternate embodiments, the number of transmit and receive buffers is user selectable.

Figure 12:
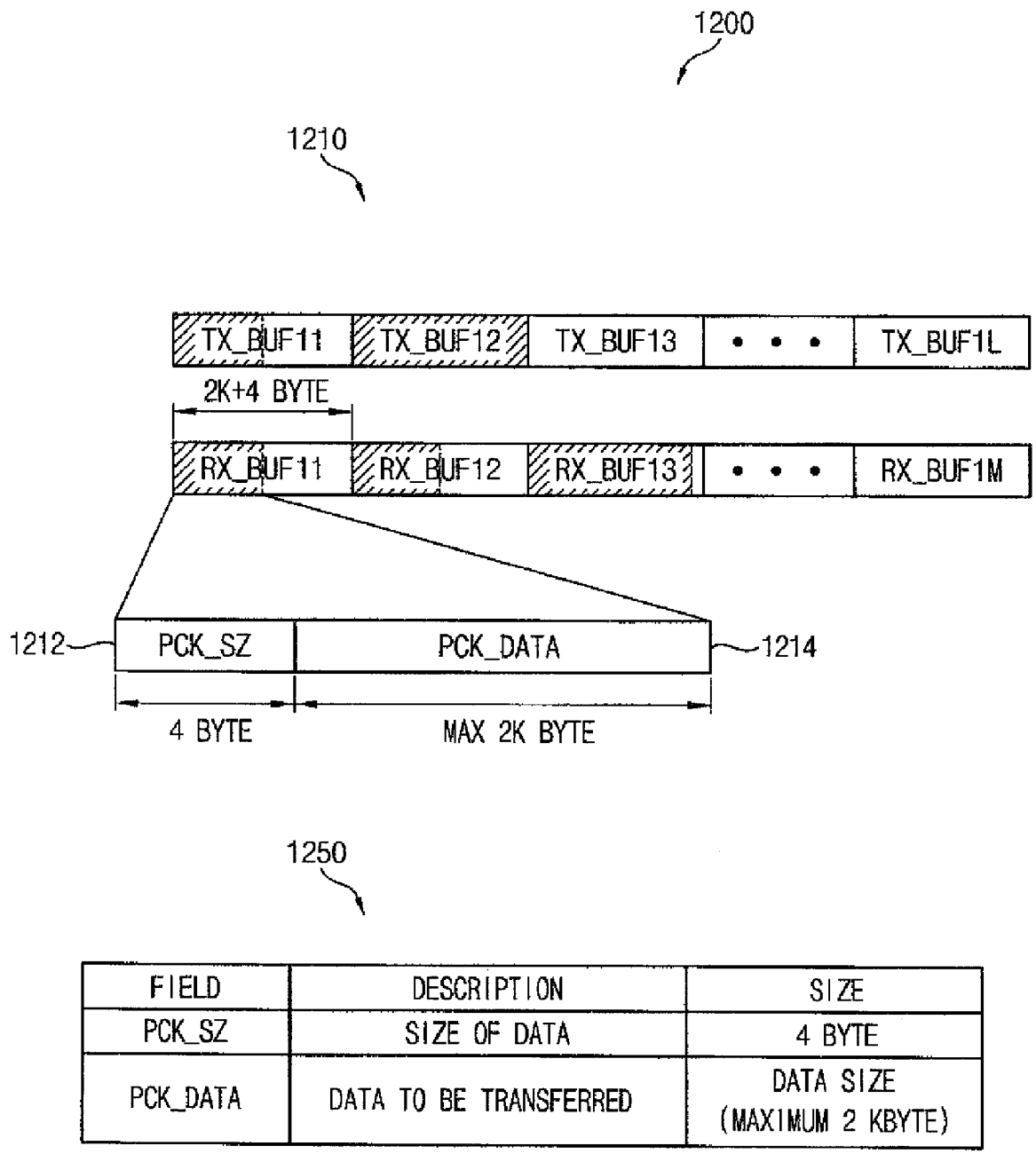
FIG. 12 shows a schematic data diagram for a user data format in the inter-processor communications (IPC) channels of FIGS. 10 or 11 in accordance with an exemplary embodiment of the present disclosure.

Turning now to FIG. 12, a shared bank channel, which may hold the actual data corresponding to the pointers of the IPC channel 800 of FIG. 8, is indicated generally by the reference numeral 1200. User or application data is stored in buffers 1210 of the channel 1200 of a shared bank, such as the bank 912 of FIG. 9. The buffers 1210 may include a plurality L of transmit buffers TX_BUF, and a plurality M of receive buffers RX_BUF. It shall be understood that the designation of transmit and receive buffers for the shared buffers are different with respect to each of the processors. That is, a shared buffer known as a transmit buffer to one processor may be known as a receive buffer to the other processor.

Each buffer 1210 includes a PCK_SZ packet size field 1212, which may be four bytes, for example, and a PCK_DATA packet data field 1214, which may have a maximum size of 2 Kbytes, for example. A table 1250 further describes the user data buffers 1210 for this exemplary embodiment. According to the table, the PCK_SZ field is four bytes long and contains the size of the data packet, and the PCK_DATA field is up to 2 Kbytes long and contains the data to be transferred.

Figure 13:
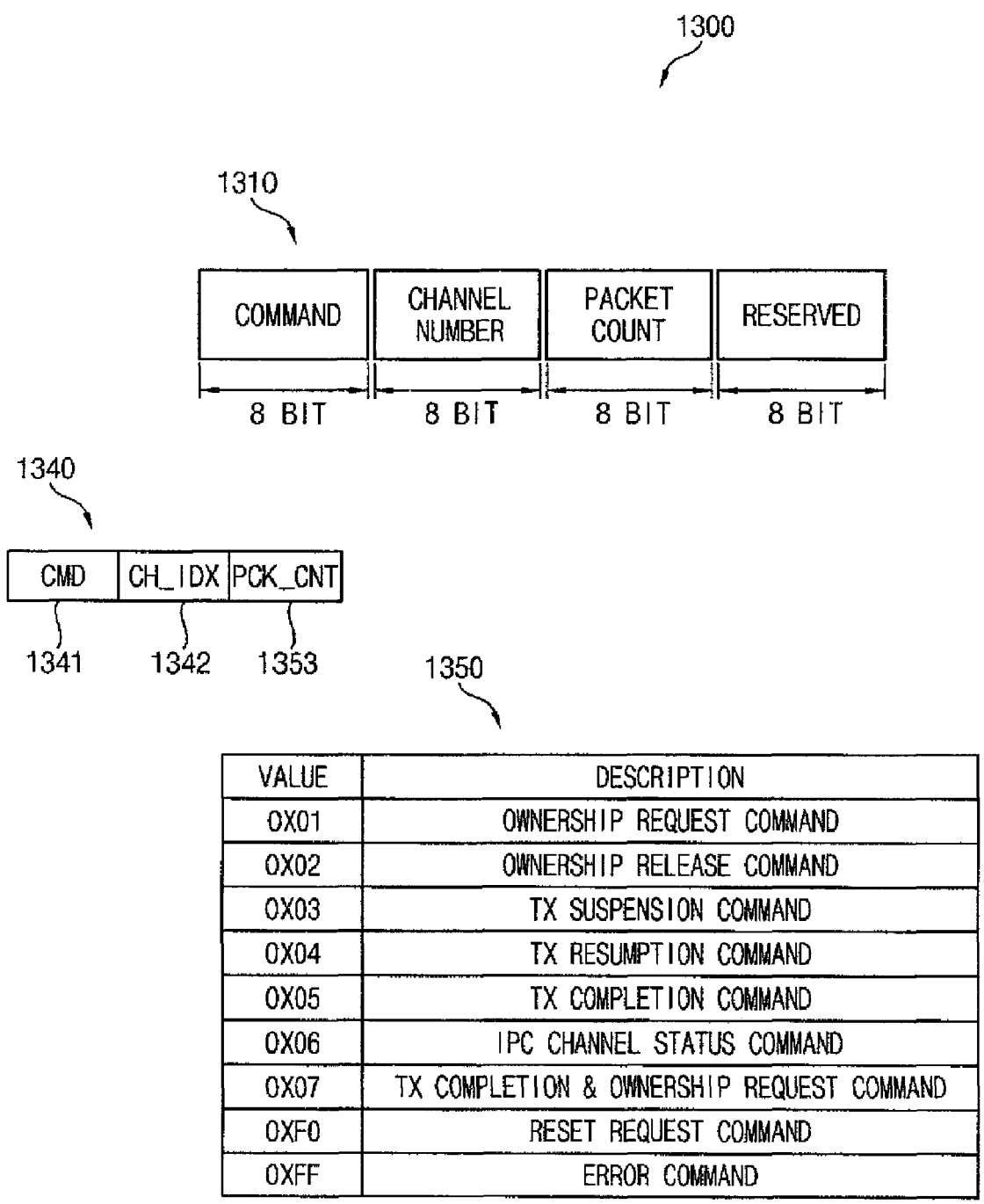
FIG. 13 shows a schematic data diagram for a message data format for a mailbox of FIG. 9 in accordance with an exemplary embodiment of the present disclosure.

As shown in FIG. 13, message data for a mailbox of FIG. 9 is indicated generally by the reference numeral 1300. Here, the message data may be formatted into four fields 1310. The fields may include an eight-bit command field, an eight-bit channel number field, an eight-bit packet count field, and an eight-bit reserved field. For example, the message data may be formatted into at least three fields 1340, including a command (CMD) region 1341, a channel index (CH_IDX) region 1342, and a packet number storage region (PCK_CNT) 1343.

Command values 1350 are further described. The eight-bit CMD field 1341 may hold any value between 0x01 and 0xFF. Here, the command value 0x01 is an ownership request command, the command value 0x02 is an ownership release command, the command value 0x03 is a transmit suspension command, the command value 0x04 is a transmit resumption command, the command value 0x05 is a transmit completion command, the command value 0x06 is an IPC channel status command, the command value 0x07 is a transmit completion and ownership request command, the command value 0xF0 is a reset request command, and the command value 0xFF is an error command.

Figure 14:
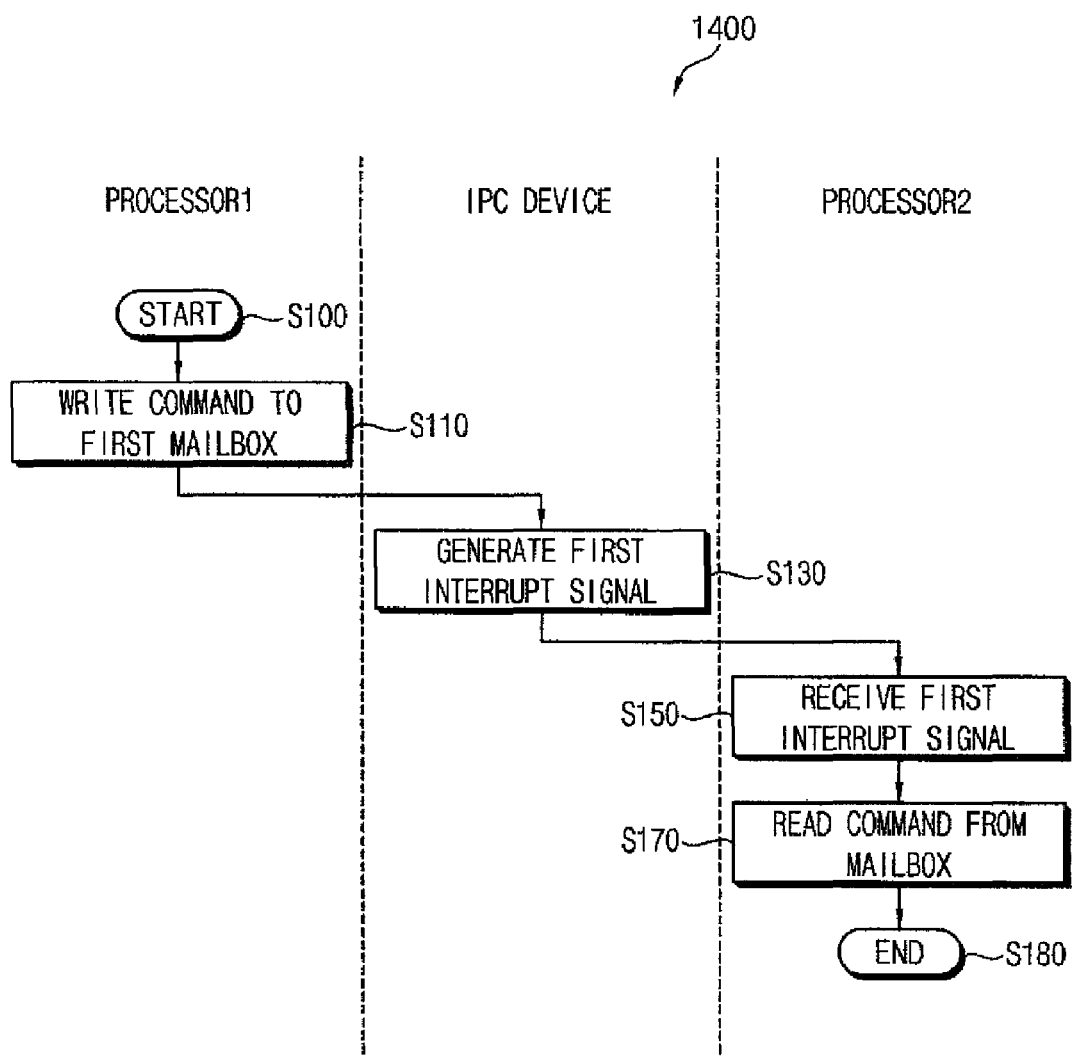
FIG. 14 shows a schematic flow diagram for a method of communication between two processors through a mailbox in accordance with an exemplary embodiment of the present disclosure.

Turning to FIG. 14, a method of communication between two processors through a mailbox is indicated generally by the reference numeral 1400. The method 1400 includes a start block S100 that passes control to function block S110, where a first processor writes a command to a first mailbox. The first processor passes control to a function block S130, where an IPC device generates a first interrupt signal. The IPC device passes control to a function block S150, where a second processor receives a first interrupt signal. The second processor, in turn, passes control to a function block S170, where it reads a command from its mailbox, and then passes control to an end block S180.

Figure 15:
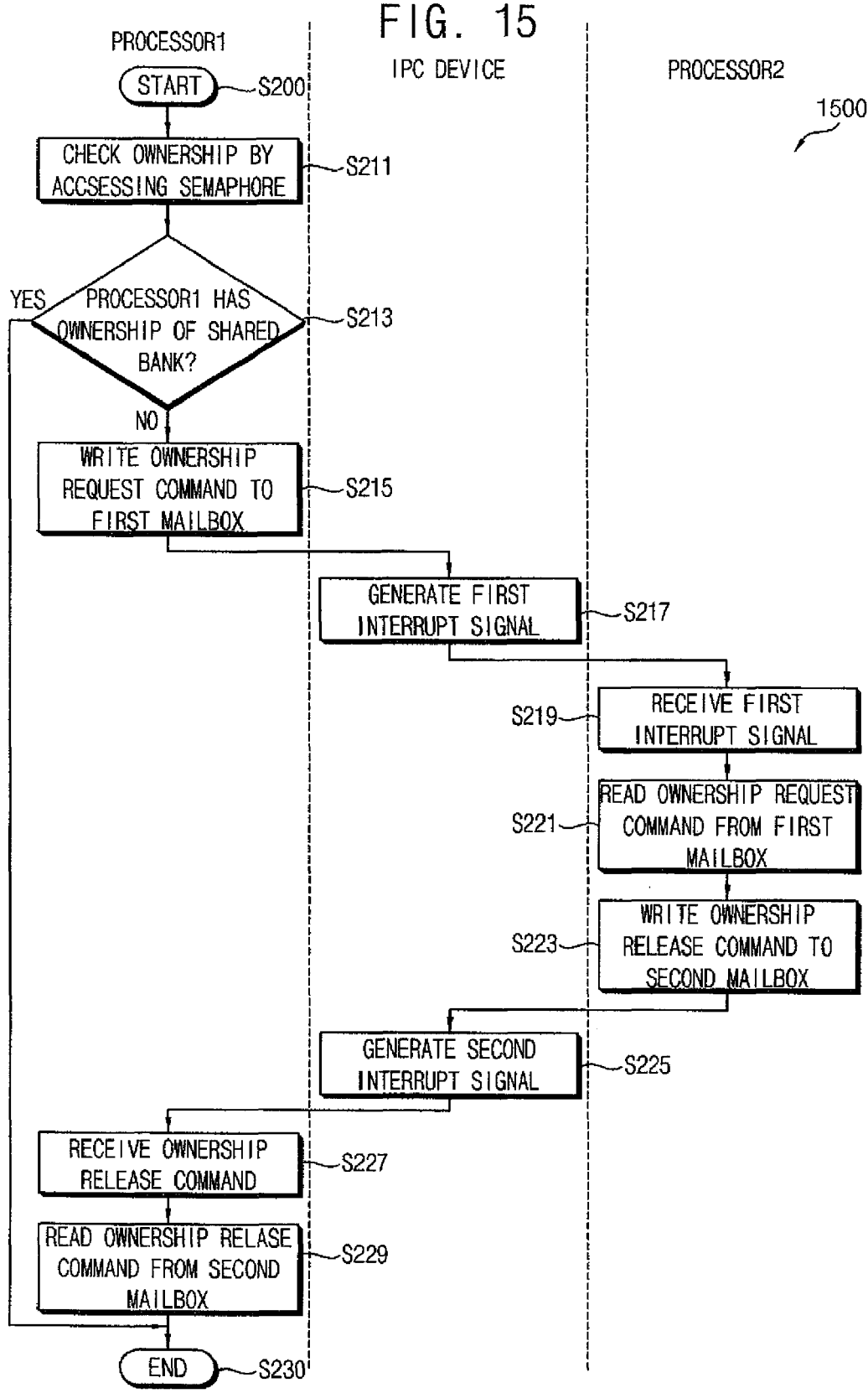
FIG. 15 shows a schematic flow diagram for a change of ownership of the shared region from the second processor to the first processor in accordance with an exemplary embodiment of the present disclosure.

Turning now to FIG. 15, a method to change ownership of the shared region from a second processor to a first processor is indicated generally by the reference numeral 1500. The method 1500 includes a start block S200 that passes control to function block S211, where a first processor checks ownership by accessing a semaphore. The block S211 passes control to a decision block S213, which determines from the semaphore whether the first processor has ownership of the shared bank. If so, control is passed to an end block S230. If not, control is passed to a function block S215, where the first processor writes an ownership request to the first mailbox, and passes control to a function block S217.

At function block S217, an IPC device generates a first interrupt signal, and passes control to a function block S219. At S219, a second processor receives the first interrupt signal, and passes control to a function block S221. At block S221, the second processor reads the ownership request command from the first mailbox, and passes control to a function block S223. At block S223, the second processor writes an ownership release command to a second mailbox, and passes control to a function block S225.

At block S225, the IPC device generates a second interrupt signal, and passes control to a function block S227. At block S227, in turn, the first processor receives the ownership release command, and passes control to a function block S229. At the block S229, the first processor reads the ownership release command from the second mailbox, and passes control to an end block S230.

Figure 16:
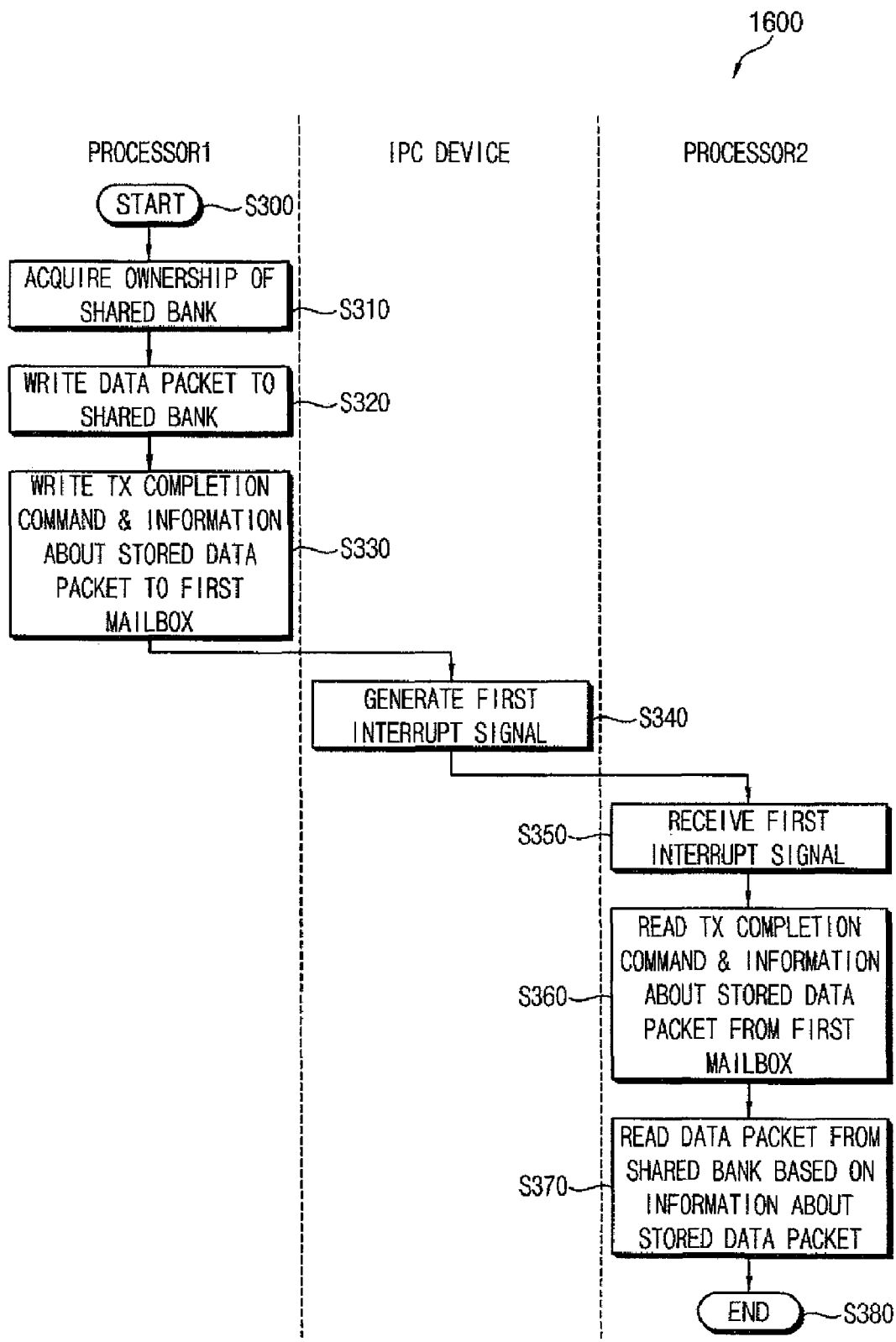
FIG. 16 shows a schematic flow diagram for a data exchange through a shared region in accordance with an exemplary embodiment of the present disclosure.

As shown in FIG. 16, a method to exchange data through a shared region is indicated generally by the reference numeral 1600. The method 1600 includes a start block S300 that passes control to function block S310, where a first processor acquires ownership of a shared bank, and passes control to a function block S320. At block S320, the first processor writes a data packet to the shared bank, and passes control to a function block S330. At block S330, the first processor writes a transmit completion command and information about the stored data packet to a first mailbox, and passes control to a function block S340.

At block S340, in turn, an IPC device generates a first interrupt signal, and passes control to a function block S350. At block S350, a second processor receives the first interrupt signal, and passes control to a function block S360. At block S360, the second processor reads the transmit completion and information about the stored data packet from the first mailbox, and passes control to a function block S370. At block S370, the second processor reads a data packet from the shared bank based on the information about the stored data packet, and passes control to an end block S380.

Figure 17:
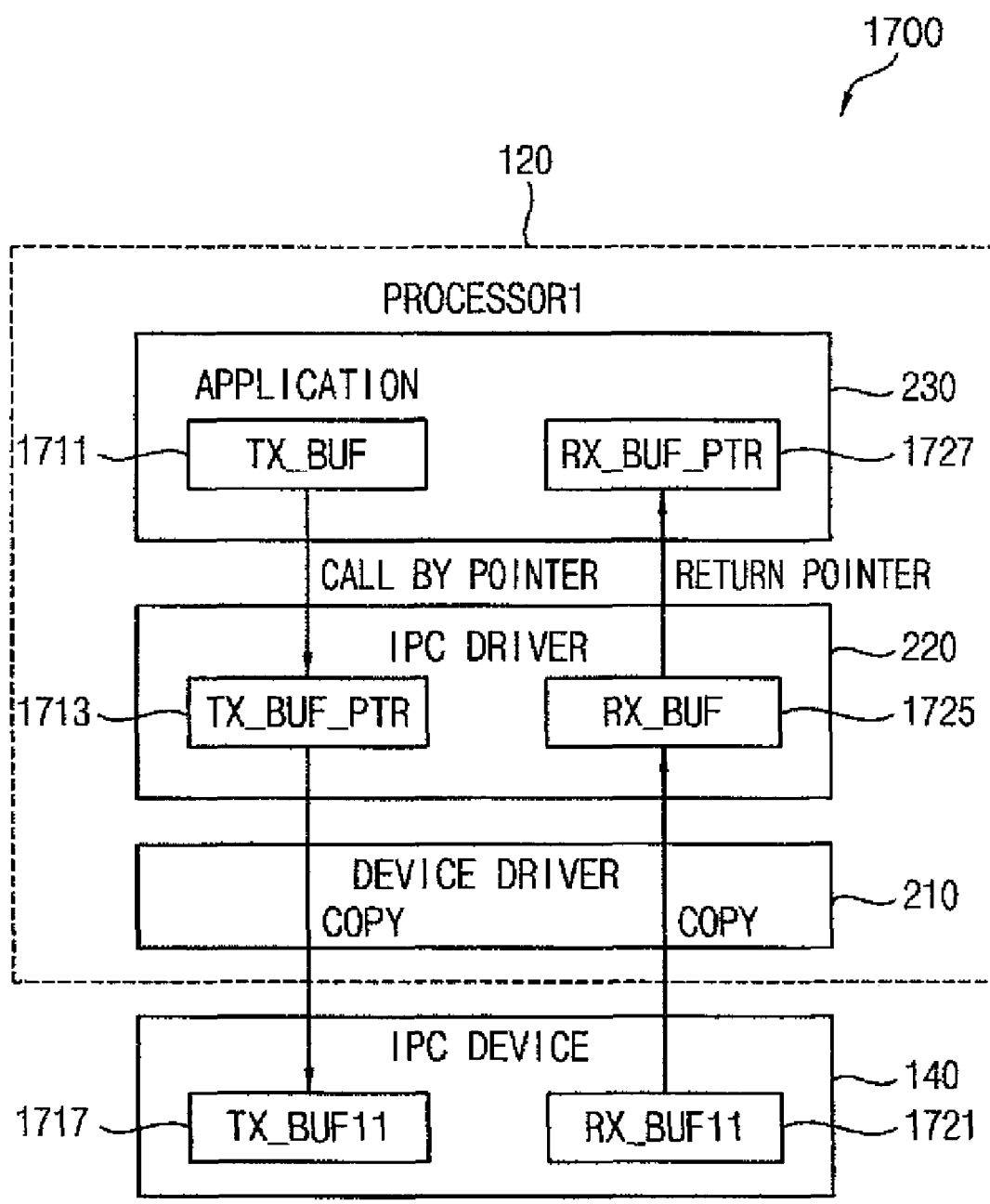
FIG. 17 shows a schematic block diagram for to minimize memory copy operations in the processor in accordance with an exemplary embodiment of the present disclosure.

Turning to FIG. 17, a processor and IPC device interconnected to minimize memory copy operations in the processor are generally indicated by the reference numeral 1700. The processor may be the first or second processor 120 or 130 of FIG. 1, for example, and the IPC device may be the IPC device 140 of FIG. 1.

The processor 120 includes the application module 230, the IPC driver 220 and the device driver 210, all of FIG. 2. Here, the application module 230 includes a transmit buffer 1711 and a receive buffer pointer 1727. The IPC driver includes a transmit buffer pointer 1713 and a receive buffer 1725. The IPC device 140 includes a transmit buffer 1717 and a receive buffer 1721.

The application module 230 is disposed to send a call by pointer for its transmit buffer 1711 to the transmit buffer pointer 1713 of the IPC driver 220. The device driver 210 is disposed to perform a copy of the application module transmit buffer 1711 indicated by the IPC driver transmit buffer pointer 1713 to the IPC device transmit buffer 1717.

The device driver 210 is disposed to perform a copy from the receive buffer 1721 of the IPC device 140 to the receive buffer 1725 of the IPC driver 220. The IPC driver is disposed to return a pointer for its receive buffer 1725 to the receive buffer pointer 1727 of the application module 230.

Figure 18:
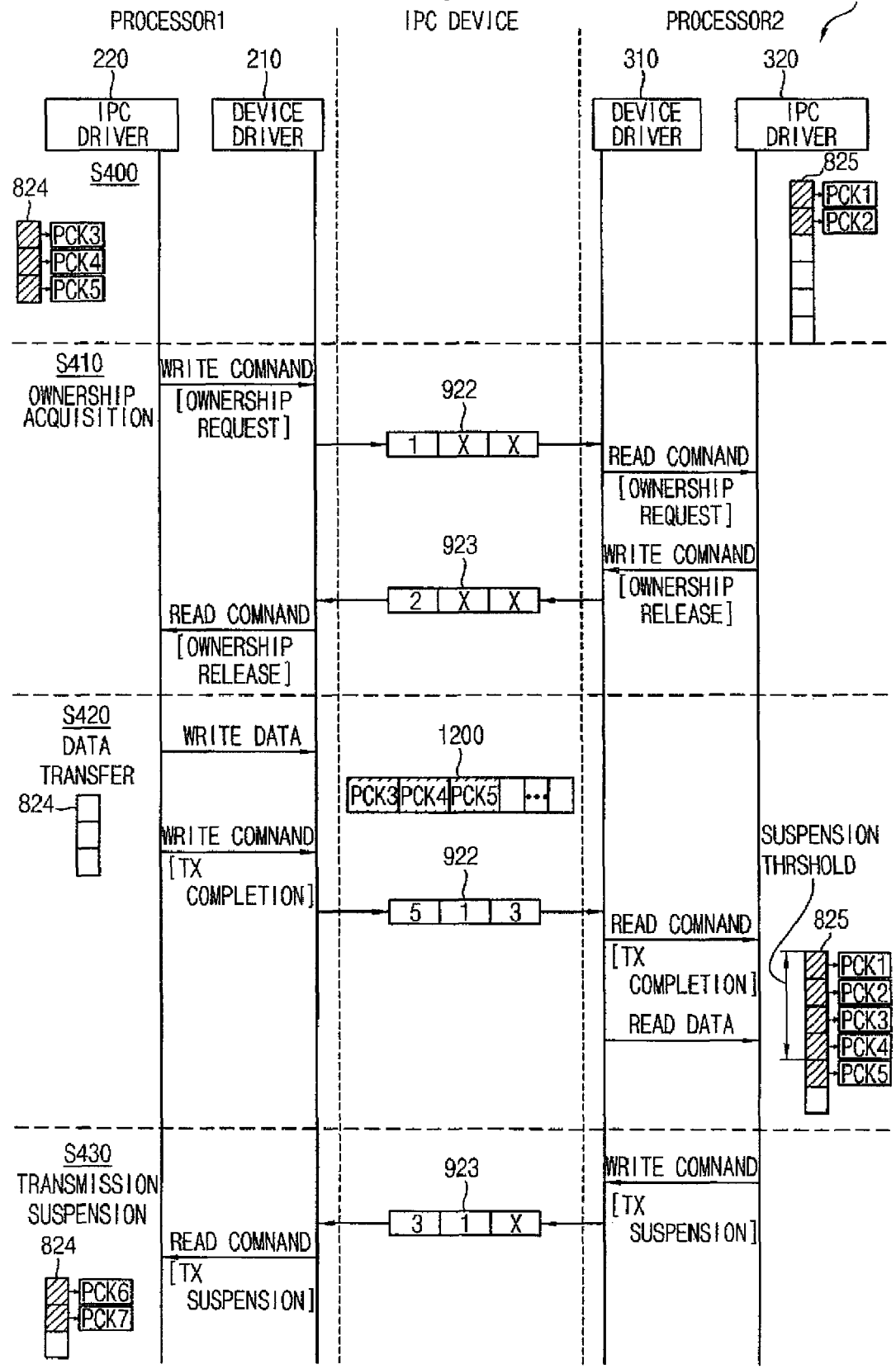
FIG. 18 shows a schematic hybrid diagram for ownership acquisition, data transfer and data suspension in accordance with an exemplary embodiment of the present disclosure.

Turning now to FIG. 18, a method for ownership acquisition, data transfer and data suspension is indicated generally by the reference numeral 1800. At a step S400, a first processor 120 of FIG. 1 has an active device driver 210 and an active IPC driver 220, both of FIG. 2. The IPC driver 220 has an IPC transmit channel 824 of FIG. 8 presently containing packets PCK3, PCK4 and PCK5. An IPC device 140 of FIG. 1 is disposed between the first processor 120 and a second processor 130 of FIG. 1, which has an active device driver 310 and an active IPC driver 320, both of FIG. 3. The IPC driver 320 has an IPC receive channel 825 of FIG. 8 presently containing packets PCK1 and PCK2.

At a subsequent step S410, ownership acquisition is performed. Here, the first processor uses the IPC driver 220 to send an ownership request command through the device driver 210, which writes to the IPC device 140 of FIG. 1 the ownership request command value 0x01, as set forth in table 1350 of FIG. 13, to the highest order byte of the mailbox 922 of FIG. 9 according to the format 1340 of FIG. 13, where the two lower order bytes are not needed for this particular command.

In the second processor, the IPC driver 320 reads the ownership request command through the device driver 310, which copies the value 0x01 from the mailbox 922. The IPC driver 320 then writes to the IPC device an ownership release command through the device driver 310, which writes the ownership release value of 0x02 to the second mailbox 923 of FIG. 9. Back in the first processor, the IPC driver 220 reads the ownership release command through the device driver 210, which copies the value 0x02 from the mailbox 923.

At a subsequent step S420, data transfer is performed. Here, the first processor uses its IPC driver 220 to write data packets PCK3, PCK4 and PCK5 through its device driver 210 to the data packet buffers 1210 of a first processor transmit side channel 1200 of a shared bank 912 of the IPC device 140. The first processor then writes a transmit completion command with arguments to the mailbox 922, where the value of the transmit completion command is 0x05, the value of the channel index is 0x01, and the value of the packet count is 0x03.

In the second processor, the IPC driver 320 reads the transmit completion command through the device driver 310, which copies the transmit completion command value 0x05, the channel index value 0x01, and the packet count value 0x03 from the mailbox 922. Next, the IPC driver 320 reads the data packets PCK3, PCK4 and PCK5 through the device driver 310 from the buffers 1210 of the shared bank 912, and appends them to the receive side IPC channel 825. Here, the receive side IPC channel 825 has a total of five packets, which exceeds its suspend threshold of four packets in this particular example.

Thus, at a step S430, transmission suspension is performed. Here, the second processor writes a transmission suspension command having a value of 0x03 through the device driver 310 to the second mailbox 933 of the IPC device 140. The first processor uses its IPC driver 220 to read the transmission suspension command through its device driver 210 from the mailbox 923. Therefore, the first processor does not yet try to send two more packets PCK6 and PCK7 that are present in its IPC channel 824.

Figure 19:
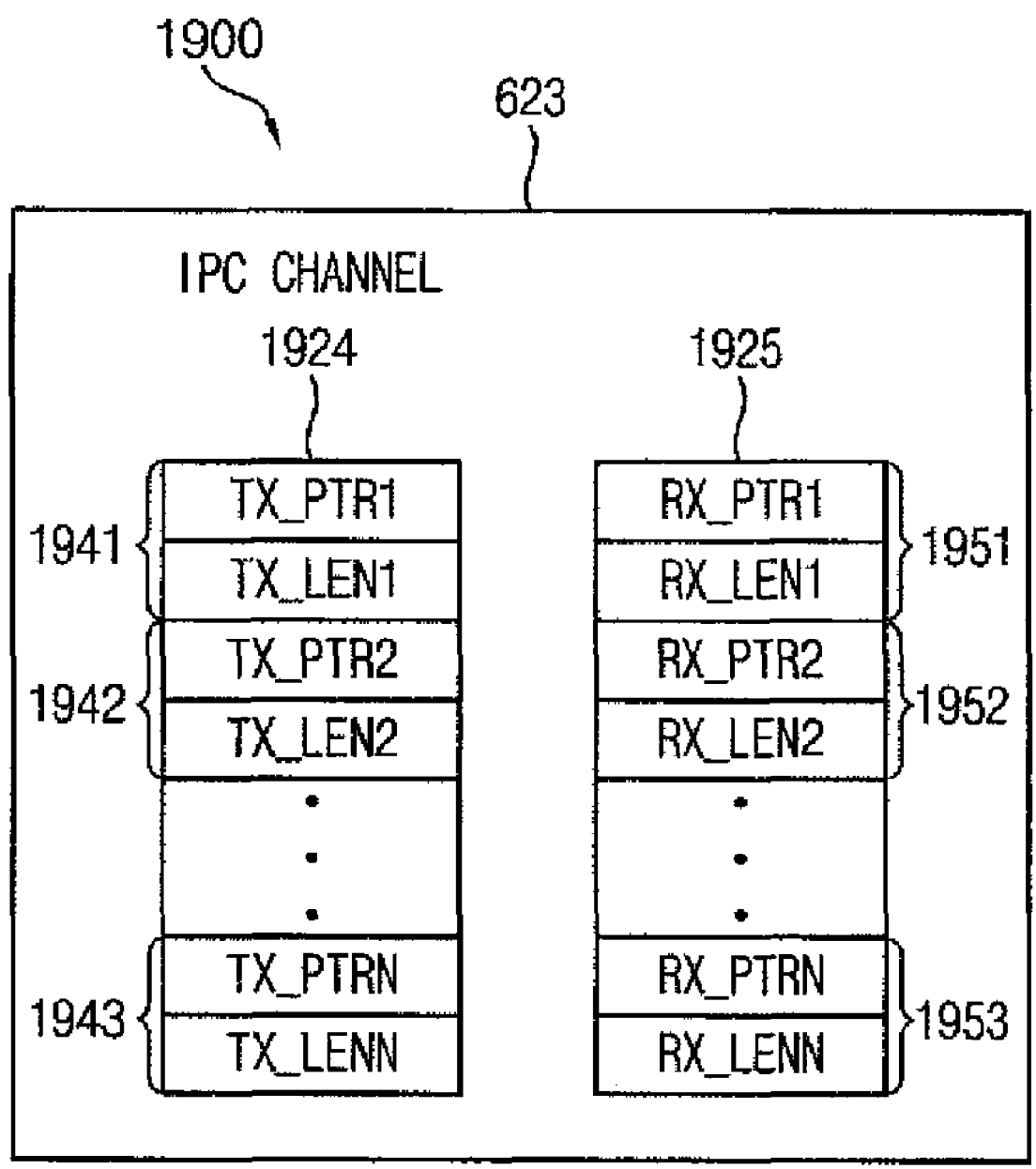
FIG. 19 shows a schematic block diagram for an IPC channel in accordance with an exemplary embodiment of the present disclosure.

As shown in FIG. 19, an IPC channel is indicated generally by the reference numeral 1900 The IPC channel 1900 may be any pointer-type IPC channel 623 of FIG. 6, for example, as used by the IPC drivers 220 or 320 of FIGS. 2 or 3, respectively. The channel 1900 includes a transmit side channel and a receive side channel, both with respect to one of the processors. The transmit side channel includes N transmit side buffers 1941, 1942 . . . 1943. Here, unlike the IPC channel 800 of FIG. 8, the receive side channel has a different number M of receive side buffers 1951, 1952 . . . 1953, but alternate embodiments may have any number of buffers, where the number of receive side buffers need not be the same as the number of transmit side buffers. Each packet includes a packet pointer PTR and a packet length LEN.

Figure 20:
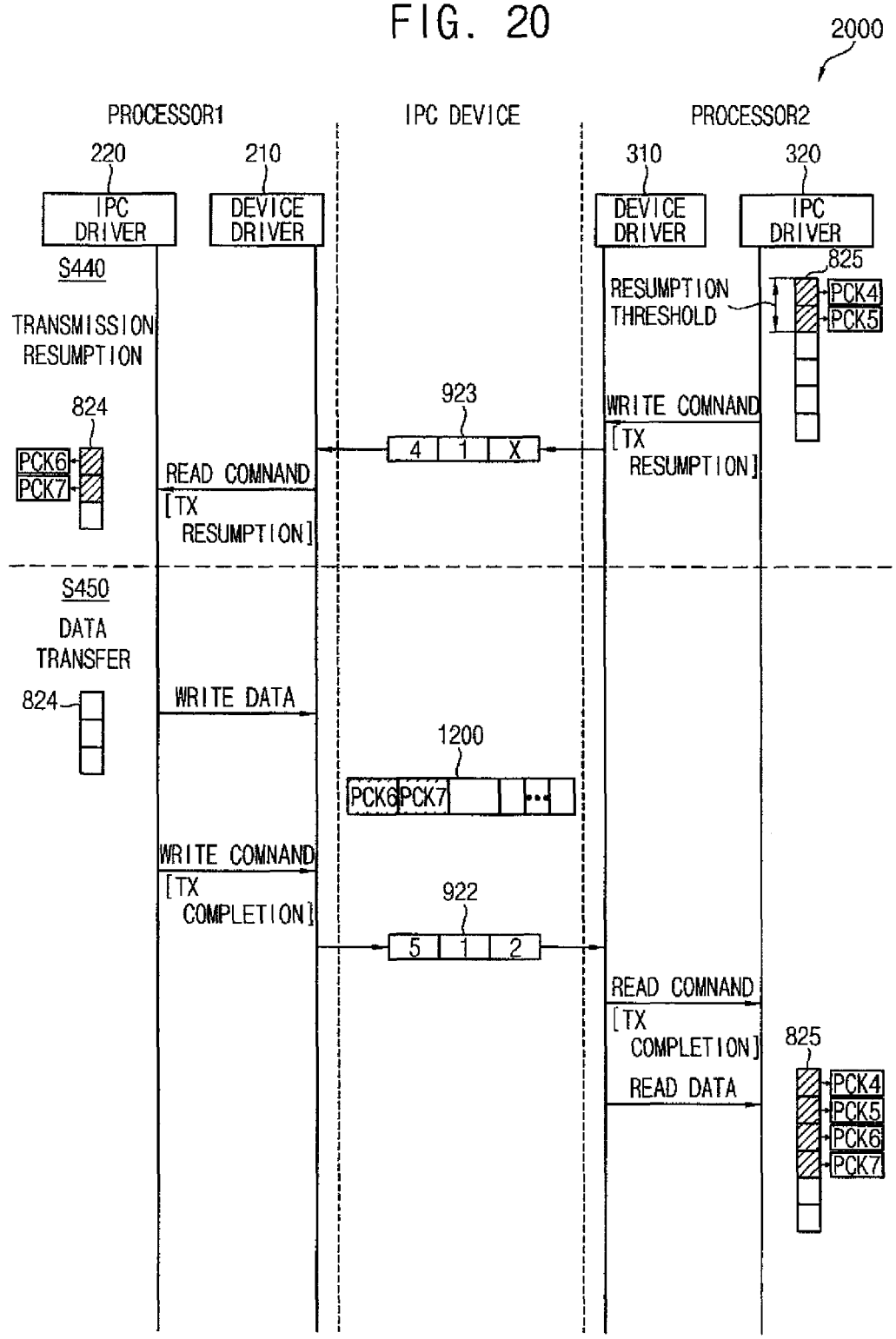
FIG. 20 shows a schematic hybrid diagram for transmission resumption and data transfer in accordance with an exemplary embodiment of the present disclosure.

Turning to FIG. 20, a method for transmission resumption and data transfer is indicated generally by the reference numeral 2000. At a step S440, the first processor 120 of FIG. 1 has an active device driver 210 and an active IPC driver 220, both of FIG. 2. The first processors IPC driver 220 has an IPC channel 824 that presently contains packets PCK6 and PCK7. An IPC device 140 of FIG. 1 is disposed between the first processor 120 and the second processor 130 of FIG. 1, which has an active device driver 310 and an active IPC driver 320, both of FIG. 3 The IPC driver 320 has an IPC channel 825 of FIG. 8 presently containing two packets PCK4 and PCK5, where two packets is the resumption threshold. Here, the second processor uses its IPC driver 320 to write a transmit resumption command through its device driver 310 to the IPC device mailbox 923 of FIG. 9, where the transmit resumption command has a value of 0x04 in accordance with table 1350 of FIG. 1300. The first processor, in turn, uses its IPC driver 220 to read the transmit resumption command through its device driver 210 from the mailbox 923 on the IPC device.

At a subsequent step S450, the first processor's IPC driver 220 empties its IPC channel 824 by writing data packets PCK6 and PCK7 through its device driver to the first processor's transmit side channel 1200 of a shared bank 912 of the IPC device 140. The first processor then writes a transmit completion command with arguments to the mailbox 922, where the value of the transmit completion command is 0x05, the value of the channel index is 0x01, and the value of the packet count is 0x02.

In the second processor, the IPC driver 320 reads the transmit completion command through the device driver 310, which copies the transmit completion command value 0x05, the channel index value 0x01, and the packet count value 0x02 from the mailbox 922. Next, the IPC driver 320 reads the data packets PCK6 and PCK7 through the device driver 310 from the second processor's receive side channel 1200 of the shared bank 912, and appends them to the receive side IPC channel 825. Here, the receive side IPC channel 825 has a total of four packets, which does not yet exceed its suspend threshold of four packets in this particular example.

Figure 21:
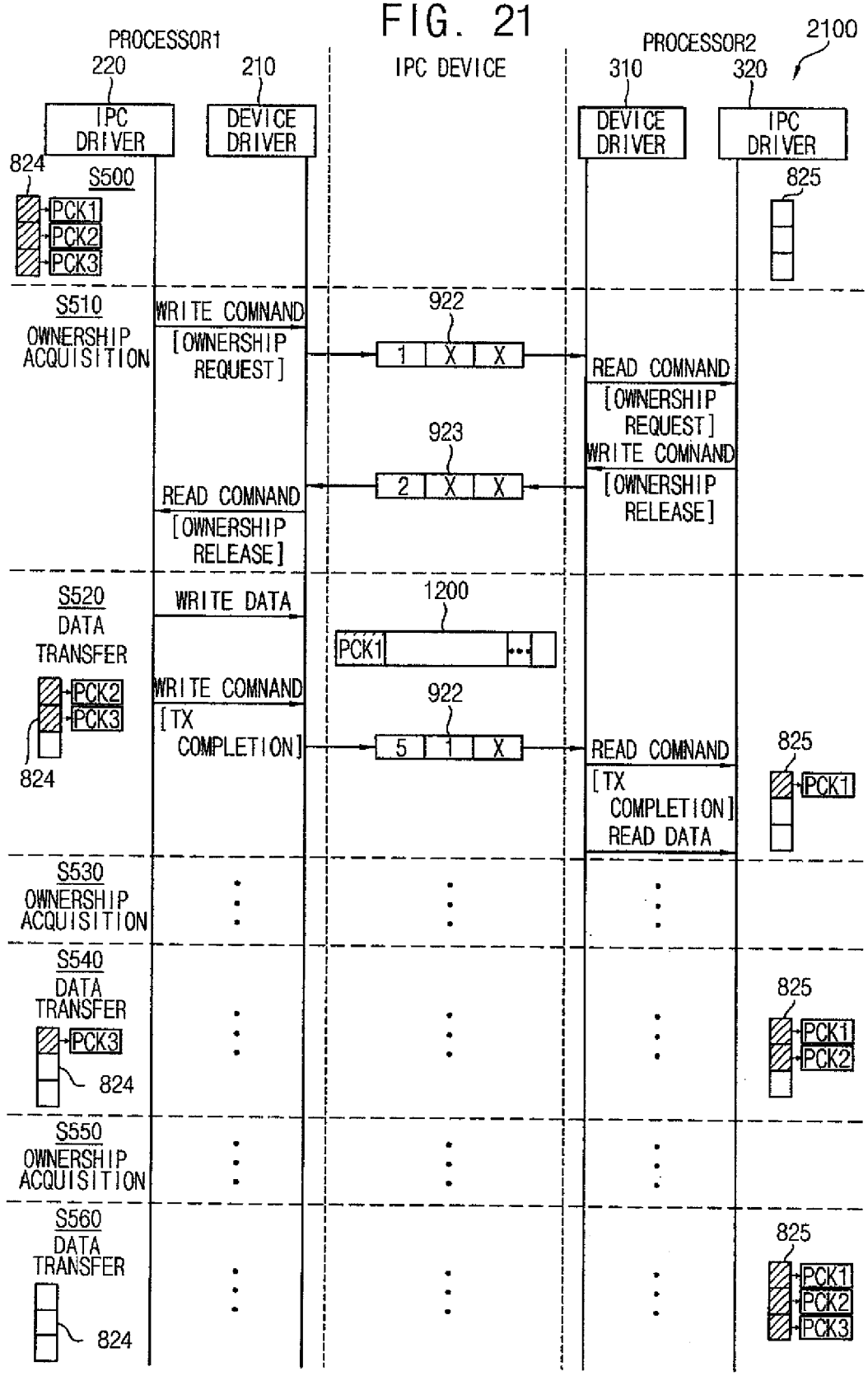
FIG. 21 shows a schematic hybrid diagram for a data transfer in single packet mode in accordance with an exemplary embodiment of the present disclosure.

Turning now to FIG. 21, a method for data transfer in single packet mode is indicated generally by the reference numeral 2100. At a step S500, the first processor 120 has a transmit side IPC channel 824 containing packets PCK1, PCK2 and PCK3. The second processor 130 has a receive side IPC channel 825 that is empty.

At a step S510, the first processor writes an ownership request command of 0x01 to the first mailbox 922 on the IPC device. The second processor 130, in turn, reads the ownership request command from the first mailbox 922 and writes an ownership release command of 0x02 to the second mailbox 923. The first processor reads the ownership release command from the mailbox 923.

At a step S520, the first processor writes one data packet PCK1 to the first processor's transmit side channel 1200 of a shared bank 912 of the IPC device 140, and then writes a transmit complete command of 0x05 with arguments for channel index of 0x01 and packet count of 0x01 to the mailbox 922. The second processor reads the transmit completion command with arguments from the mailbox 922, and then reads the data packet PCK1 from the second processor's receive side channel 1200 to the second processor's receive side IPC channel 825. Thus, the first processor 120 has a transmit side IPC channel 824 containing packets PCK2 and PCK3, while the second processor 130 has a receive side IPC channel 825 containing packet PCK1.

At a step S530, the first processor writes an ownership request command of 0x01 to the first mailbox 922 on the IPC device. The second processor 130, in turn, reads the ownership request command from the first mailbox 922 and writes an ownership release command of 0x02 to the second mailbox 923. The first processor reads the ownership release command from the mailbox 923.

At a step S540, the first processor writes one data packet PCK2 to the first processors transmit side channel 1200 of a shared bank 912 of the IPC device 140, and then writes a transmit complete command of 0x05 with arguments for channel index of 0x01 and packet count of 0x01 to the mailbox 922. The second processor reads the transmit completion command with arguments from the mailbox 922, and then reads the data packet PCK2 from the second processor's receive side channel 1200 to the second processors receive side IPC channel 825. Thus, the first processor 120 has a transmit side IPC channel 824 containing packet PCK3, while the second processor 130 has a receive side IPC channel 825 containing packets PCK1 and PCK2.

At a step S550, the first processor writes an ownership request command of 0x01 to the first mailbox 922 on the IPC device. The second processor 130, in turn, reads the ownership request command from the first mailbox 922 and writes an ownership release command of 0x02 to the second mailbox 923. The first processor reads the ownership release command from the mailbox 923.

At a step S560, the first processor writes one data packet PCK3 to the first processor's transmit side channel 1200 of a shared bank 912 of the IPC device 140, and then writes a transmit complete command of 0x05 with arguments for channel index of 0x01 and packet count of 0x01 to the mailbox 922. The second processor reads the transmit completion command with arguments from the mailbox 922, and then reads the data packet PCK3 from the second processors receive side channel 1200 to the second processors receive side IPC channel 825. Thus, the first processor 120 has a transmit side IPC channel 824 that is empty, while the second processor 130 has a receive side IPC channel 825 containing packets PCK1, PCK2 and PCK3.

Figure 22:
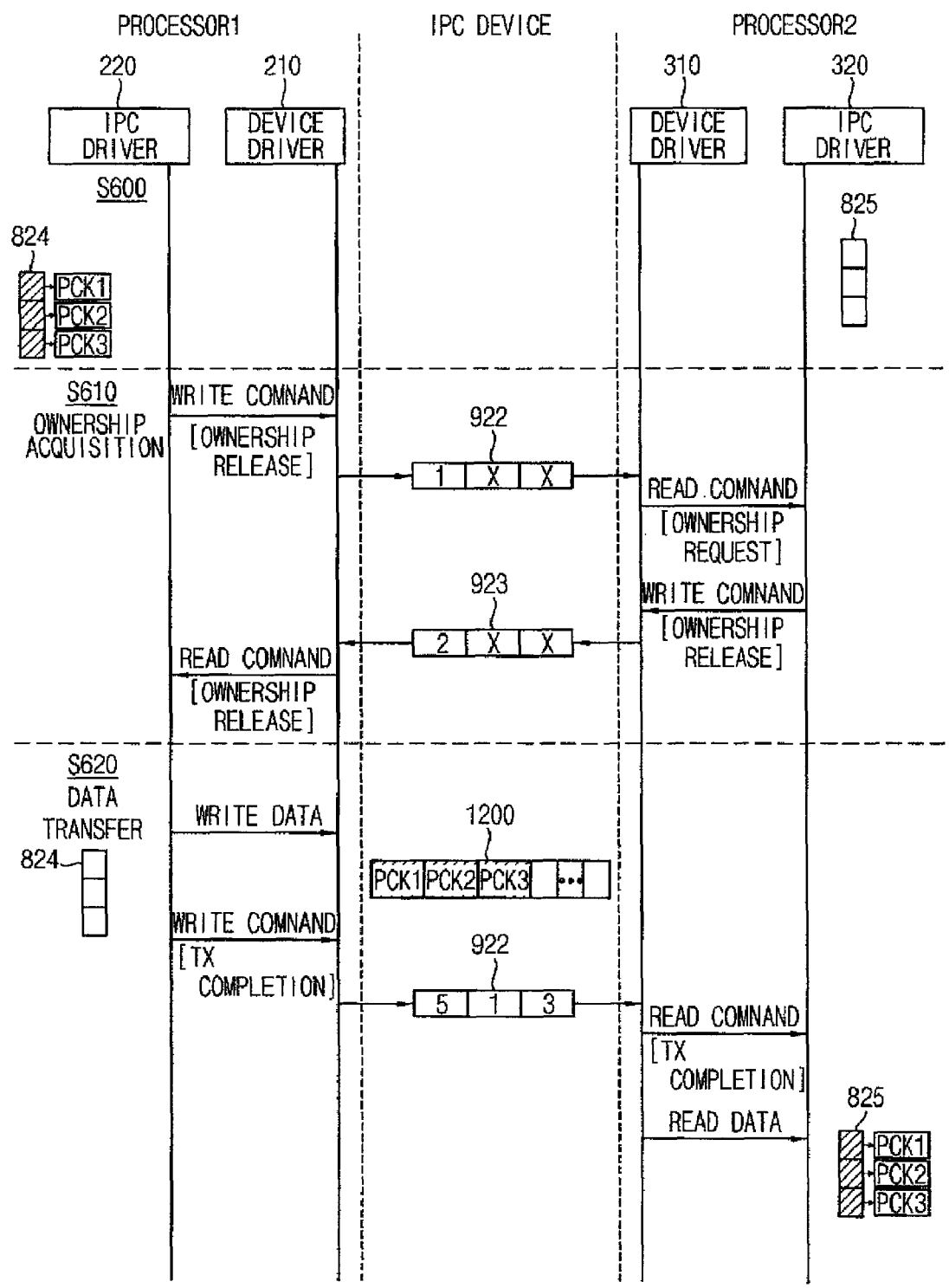
FIG. 22 shows a schematic hybrid diagram for a data transfer in burst mode in accordance with an exemplary embodiment of the present disclosure.

Turning now to FIG. 22, a method of transferring data in a burst mode is indicated generally by the reference numeral 2200. At a step S600, the first processor 120 has a transmit side IPC channel 824 containing packets PCK1, PCK2 and PCK3. The second processor 130 has a receive side IPC channel 825 that is empty.

At a step S610, the first processor writes an ownership request command of 0x01 to the first mailbox 922 on the IPC device. The second processor 130, in turn, reads the ownership request command from the first mailbox 922 and writes an ownership release command of 0x02 to the second mailbox 923. The first processor reads the ownership release command from the mailbox 923.

At a step S620, the first processor writes data packet PCK1, PCK2 and PCK3 to the first processor's transmit side channel 1200 of a shared bank 912 of the IPC device 140, and then writes a transmit complete command of 0x05 with arguments for channel index of 0x01 and packet count of 0x01 to the mailbox 922. The second processor reads the transmit completion command with arguments from the mailbox 922, and then reads the data packets PCK1, PCK2 and PCK3 from the second processor's receive side channel 1200 to the second processor's receive side IPC channel 825. Thus, the first processor 120 has a transmit side IPC channel 824 that is empty, while the second processor 130 has a receive side IPC channel 825 containing packets PCK1, PCK2 and PCK3.

Figure 23:
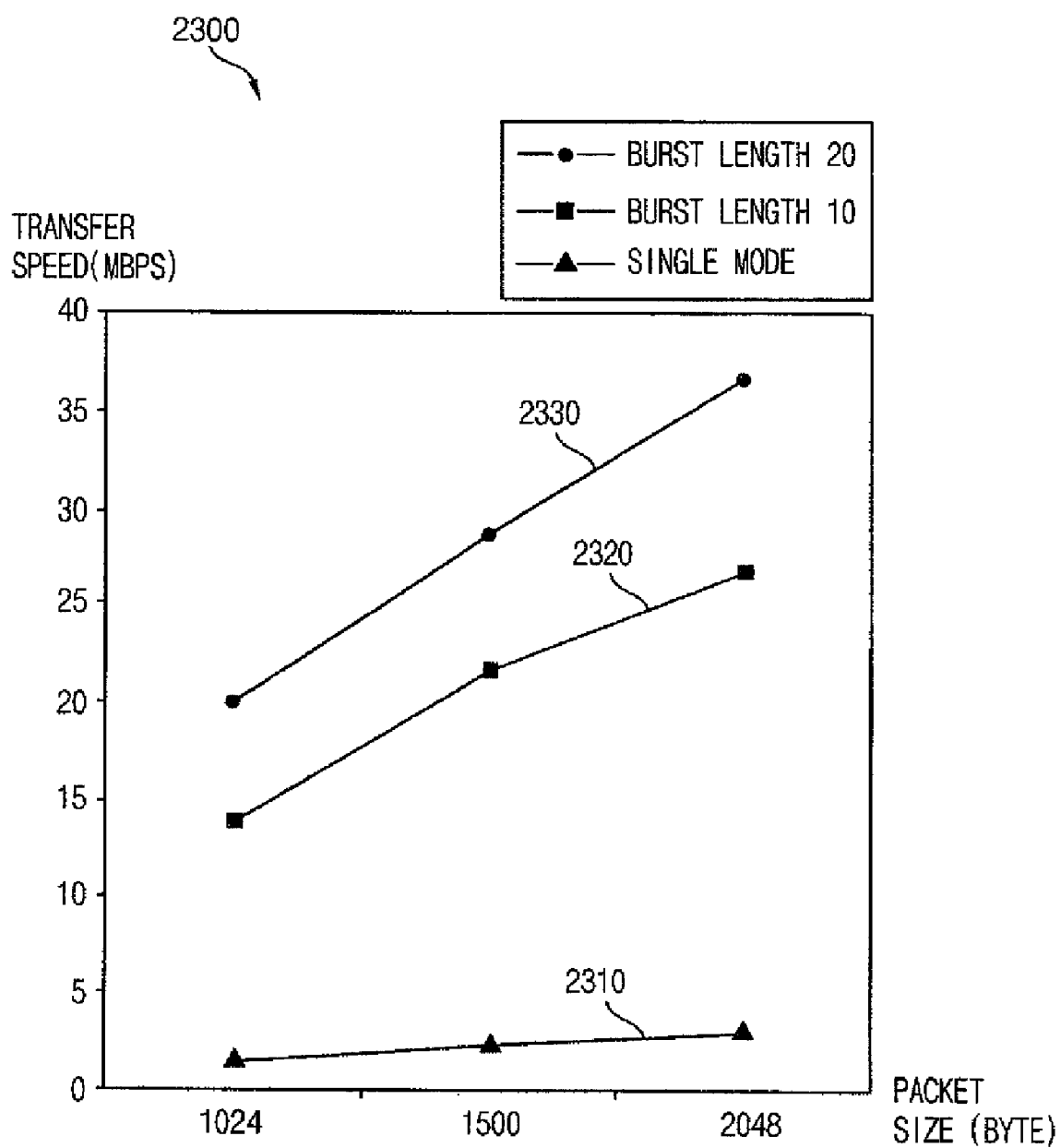
FIG. 23 shows a graphical plot diagram where the burst mode is significantly faster the single mode in accordance with an exemplary embodiment of the present disclosure.

As shown in FIG. 23, a comparative plot of single packet mode versus burst modes with different burst lengths is indicated generally by the reference numeral 2300. Here, burst lengths of 10 packets and of 20 packets are compared to single packet mode. The burst length may be implemented by setting the suspend threshold of the receiving processor's IPC driver to the desired length. Alternatively, the burst length may be implemented by setting the number of buffers in the transmit side IPC channel 824 to the desired length. The plot 2300 puts transfer speed in MBPS on the vertical axis against packet size in bytes on the horizontal axis. The plot 2300 includes a first curve 2310 for single packet mode, a second curve 2320 for a burst mode of length 10, and a third curve 2330 for a burst mode of length 20. As indicated, the burst mode of length 20 is about 10 times faster than single packet mode.

Figure 24:
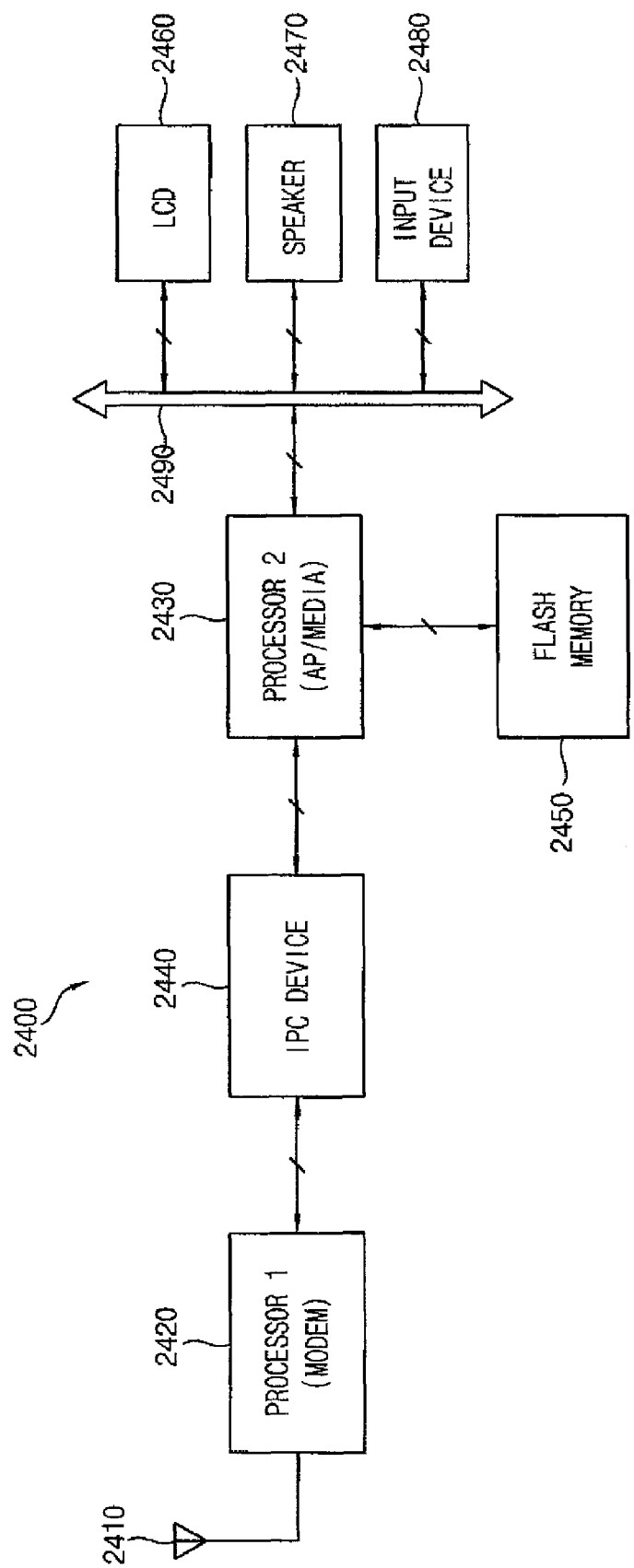
FIG. 24 shows a schematic block diagram for a communications system where one processor comprises a modem in accordance with an exemplary embodiment of the present disclosure.

Turning now to FIG. 24, another embodiment multiprocessor system is generally indicated by the reference numeral 2400. The system 100 includes a an external communications link 2410 in signal communication with a first processor or modem 2420, the modem 2420 in signal communication with an inter-processor communications (IPC) device 2440. The IPC device 140 comprises a multipath-accessible shared bank memory device. The system 2400 further includes a second processor 2430 comprising an application and/or media in signal communication with the IPC device 2440.

The system 2400 includes a flash memory 2450 in signal communication with the application processor 2430, and a system bus 2490 in signal communication with the application processor 2430. The system 2400 further includes an LCD display 2960, an audio speaker 2970, and an input device 2480, each in signal communication with the system bus 2490. In an alternate embodiment, the LCD display 2960 and the input device 2480 may be combined in a touch screen device.

As shown in FIG. 25, device specifications for an exemplary IPC device 140 of FIG. 1 are indicated generally by the reference numeral 2500. The device 2500 includes 64 MB of DRAM cells organized into four banks, including one bank dedicated to a first port, two banks dedicated to a second port, and one shared bank. The access control is per bank, the I/O width is not necessarily the same for each port, and the ports operate independently of each other. Such a device may comprise a OneDRAM™, for example.

Figure 26:
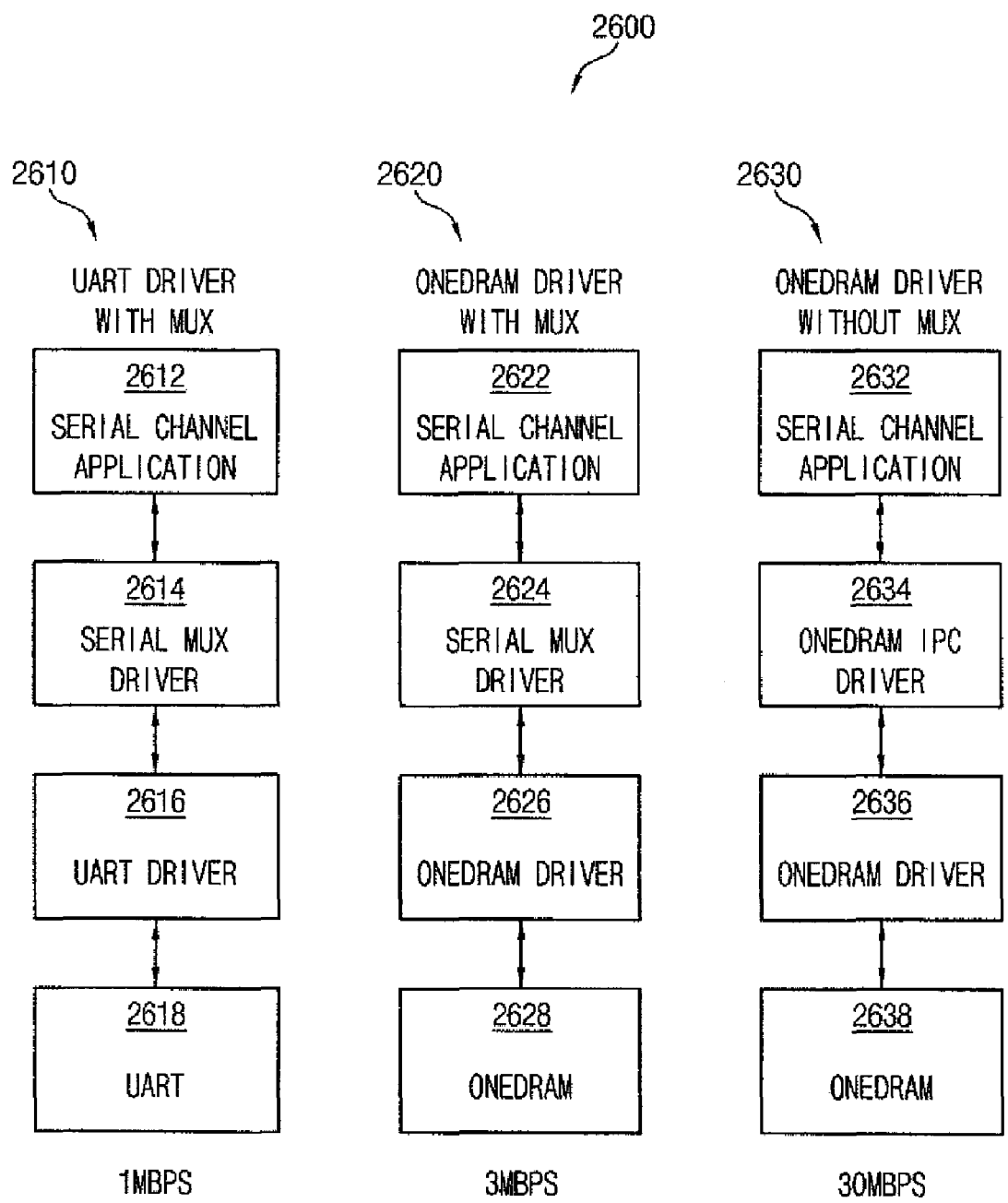
FIG. 26 shows a comparative block diagram for a UART driver with multiplexer (MUX), a OneDRAM™ driver with MUX, and a OneDRAM™ Driver without MUX in accordance with an exemplary embodiment of the present disclosure.

Turning to FIG. 26, a driver comparison is indicated generally by the reference numeral 2600. A universal asynchronous receiver-transmitter (UART) driver with multiplexer (MUX) 2610 includes a serial channel application 2612 in signal communication with a serial MUX driver 2614 The MUX driver 2614 is in signal communication with a UART driver 2616, which, in turn, is in signal communication with a UART 2618. The speed of the UART driver with MUX 2610 is on the order of about 1 Mbps.

A multipath-accessible shared bank memory device may be embodied in a OneDRAM™ device. A OneDRAM™ with MUX 2620 includes a serial channel application 2622 in signal communication with a serial MUX driver 2624. The MUX driver 2624 is in signal communication with a OneDRAM™ driver 2626, which, in turn, is in signal communication with a OneDRAM™ 2628. The speed of the OneDRAM™ with MUX 2620 is on the order of about 10 Mbps.

IPC and device drivers may be adapted to a OneDRAM™ multipath-accessible shared bank memory device. A OneDRAM™ with IPC driver 2630 includes a serial channel application 2632 in signal communication with a OneDRAM™ IPC driver 2634, such as the IPC driver 220 of FIG. 2. The OneDRAM™ IPC driver 2634 is in signal communication with a OneDRAM™ device driver 2636, such as device driver 210 of FIG. 2, which, in turn, is in signal communication with a OneDRAM™ 2638. The speed of the OneDRAM™ with IPC driver 2630 is on the order of about 100 Mbps.

Thus, the OneDRAM™ with IPC driver 2630 may more fully utilize a high-speed IPC between a modem, such as the modem 2420 of FIG. 24, and an AP processor, such as the processor 2430 of FIG. 24. Serial devices include UART, SPI, USB and the like. Shared memory devices include DPRAM, OneDRAM™, and the like.

While a MUX driver may be adequate for a serial device, it is not fast enough for a multipath-accessible shared bank memory device, such as a OneDRAM™, for example. Here, a OneDRAM™ IPC Driver with multiple channels and high-speed capabilities is significantly more efficient.

Figure 27:
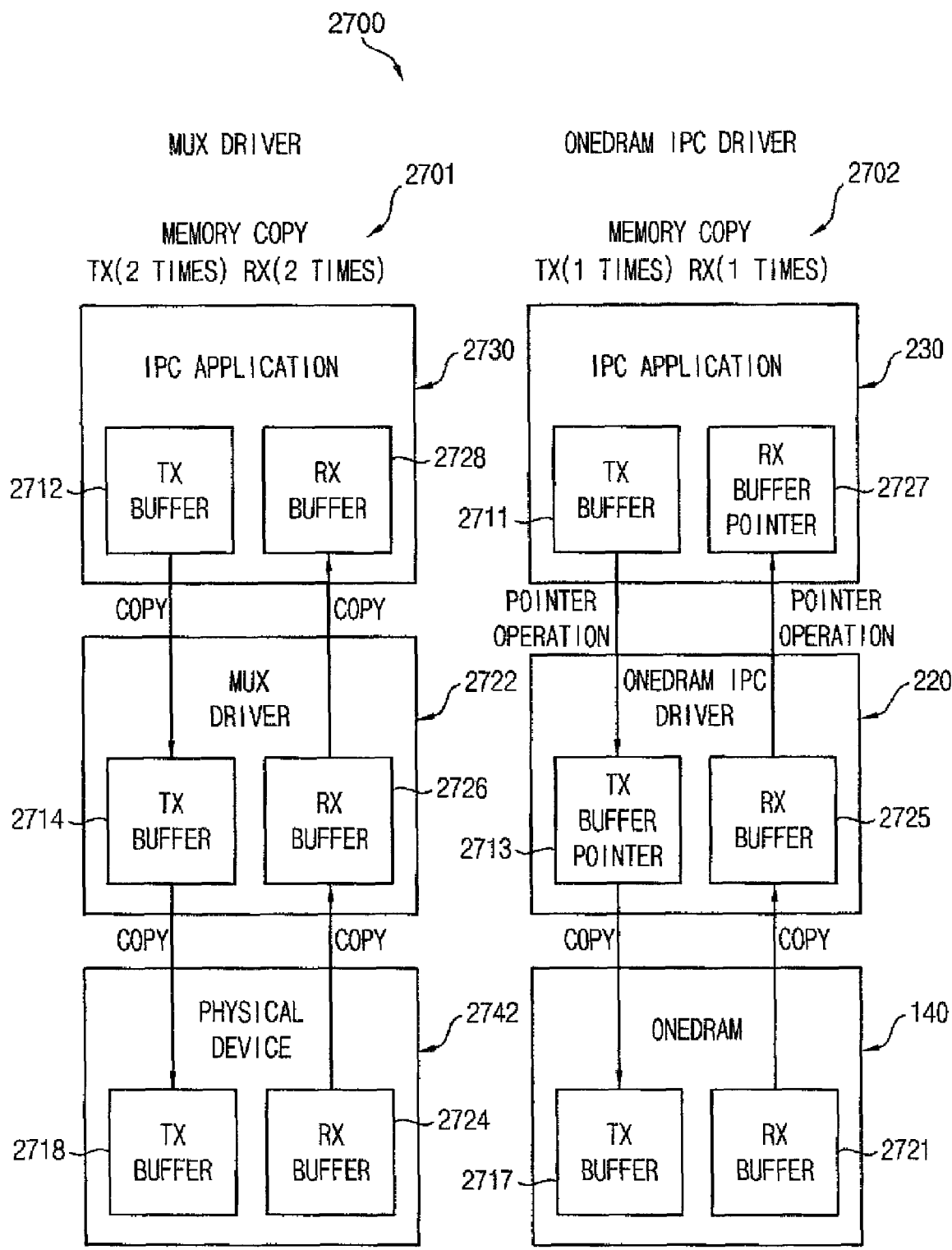
FIG. 27 shows a comparative hybrid diagram for a MUX driver versus a OneDRAM™ IPC driver as applied to minimize memory copy operations in accordance with an exemplary embodiment of the present disclosure.

Turning now to FIG. 27, a memory copy method comparison for a MUX driver versus a OneDRAM™ IPC driver is indicated generally by the reference numeral 2700. A memory copy method 2702 uses a OneDRAM™ IPC driver to communicate between a an IPC application on a processor and an IPC device, here a OneDRAM™. The processor may be the first or second processor 120 or 130 of FIG. 1, for example, and the IPC device may be the IPC device 140 of FIG. 1.

Here an IPC application module 230 communicates with a OneDRAM™ IPC driver 220, both of FIG. 2. The application module 230 includes a transmit buffer 2711 and a receive buffer pointer 2727. The IPC driver 220 includes a transmit buffer pointer 2713 and a receive buffer 2725. The IPC device 140 includes a transmit buffer 2717 and a receive buffer 2721.

The application module 230 is disposed to send a call by pointer for its transmit buffer 2711 to the transmit buffer pointer 2713 of the IPC driver 220. A copy of the application module transmit buffer 2711 indicated by the IPC driver transmit buffer pointer 2713 is performed to the IPC device transmit buffer 2717.

On the receive side, copy is performed from the receive buffer 2721 of the IPC device 140 to the receive buffer 2725 of the IPC driver 220. The IPC driver is disposed to return a pointer for its receive buffer 2725 to the receive buffer pointer 2727 of the application module 230.

In contrast, a memory copy method 2701 uses a MUX driver to communicate between a an IPC application on a processor and a physical device. Here an IPC application module 2730 communicates with a MUX driver 2722. The application module 2730 includes a transmit buffer 2712 and a receive buffer pointer 2728. The MUX driver 2722 includes a transmit buffer 2714 and a receive buffer 2726. A physical device 2742 includes a transmit buffer 2718 and a receive buffer 2724.

The application module 2730 is disposed to perform an actual copy from its transmit buffer 2712 to the transmit buffer pointer 2714 of the MUX driver 2722. Another copy of the MUX driver transmit buffer 2714 is performed to the physical device transmit buffer 2718.

On the receive side, copy is performed from the receive buffer 2724 of the physical device 2742 to the receive buffer 2726 of the MUX driver 2722. The MUX driver then performs another actual copy from its receive buffer 2726 to the receive buffer pointer 2728 of the application module 2730.

Thus, while the data is actually copied only two times in the method 2702 using the IPC driver 220, the data is actually copied four times in the method 2701 using the MUX driver 2722. Therefore, the method 2702 using the IPC driver is more efficient, and should be applied to minimize the number of memory copy operations.

Figure 28:
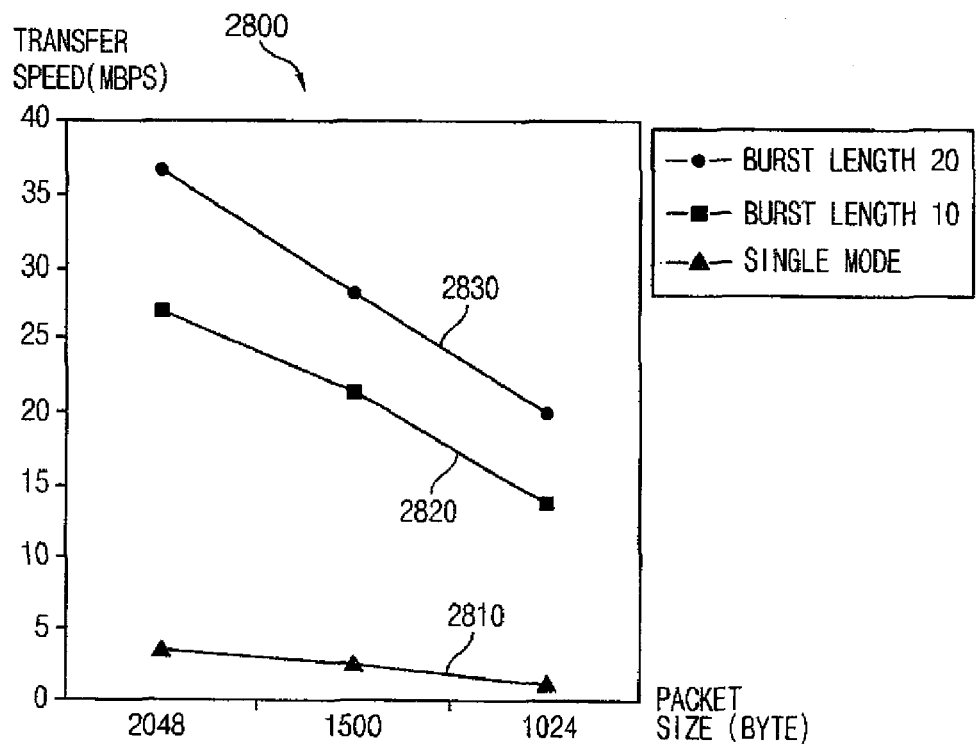
FIG. 28 shows a comparative graphical plot of performance test results for single mode versus burst mode in accordance with an exemplary embodiment of the present disclosure.

As shown in FIG. 28, a comparative plot of performance test results for single mode versus burst mode is indicated generally by the reference numeral 2800. A table 2840 sets forth the test environment, in which a modem has an ARM clock of 282 MHz and a memory clock of 69 MHz, and an application processor (AP) has an ARM clock of 533 MHz and a memory clock of 133 MHz.

The plot 2800 puts transfer speed in Mbps on the vertical axis against decreasing packet size in bytes on the horizontal axis. The plot 2800 includes a first curve 2810 for single packet mode, a second curve 2820 for a burst mode having a length of 10 packets, and a third curve 2330 for a burst mode having a length of 20 packets.

A table 2850 sets forth the test results. As indicated in the table, a packet size of 2048 bytes produced speeds of 3.0 Mbps, 36.70 Mbps and 26.67 Mbps for single, burst of length 20 and burst of length 10 modes, respectively. A packet size of 1500 bytes produced speeds of 2.3 Mbps, 28.67 Mbps and 21.74 Mbps for the single, burst of length 20 and burst of length 10 modes, respectively. A packet size of 1024 bytes produced speeds of 1.4 Mbps, 19.95 Mbps and 13.72 Mbps for the single, burst of length 20 and burst of length 10 modes, respectively. Thus, the burst mode of length 20 is greater than 10 times faster than single packet mode for all of the tested packet sizes.

Figure 29A:
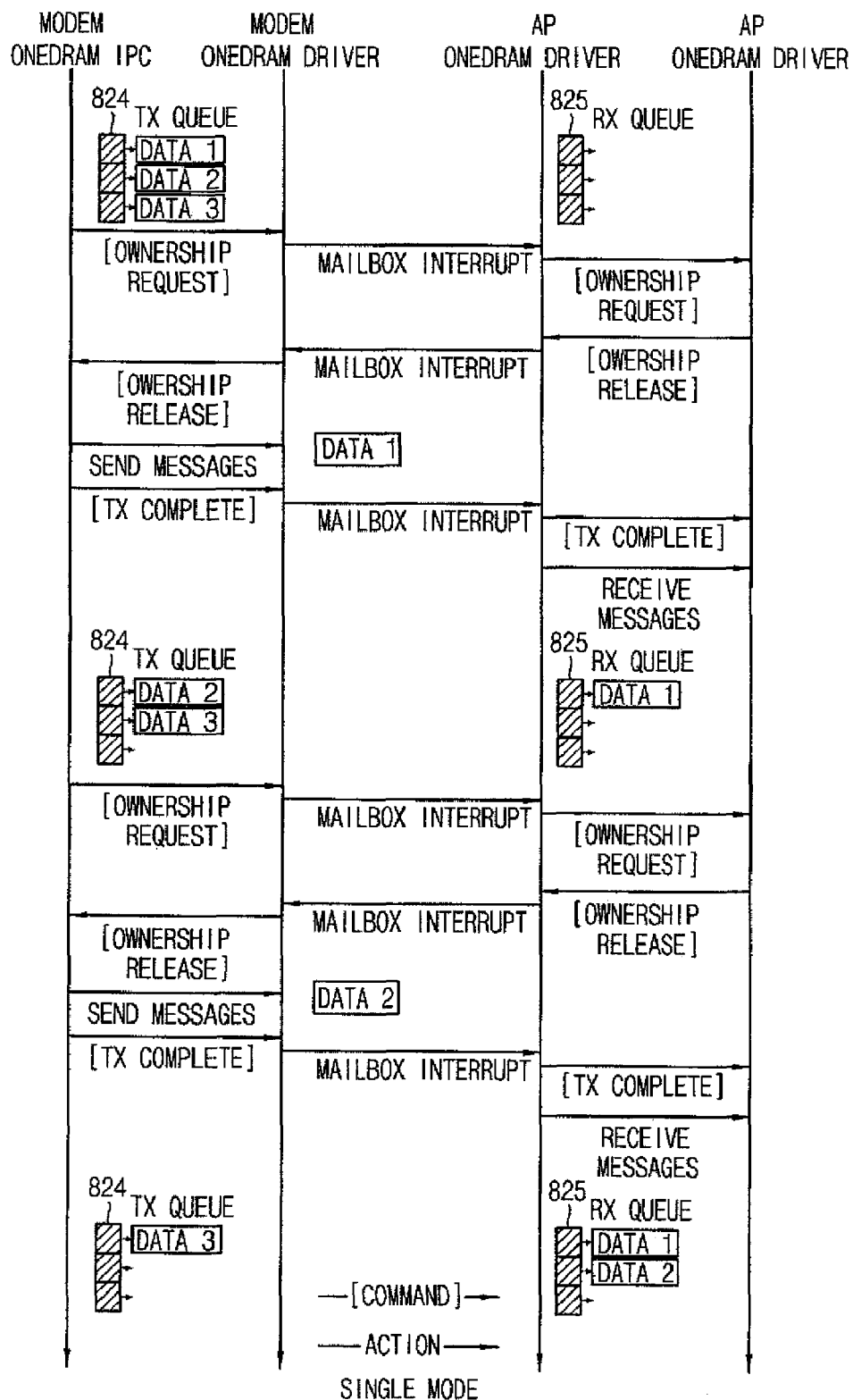
FIG. 29 shows a comparative hybrid diagram for single mode versus burst mode in accordance with an exemplary embodiment of the present disclosure.
Figure 29B:
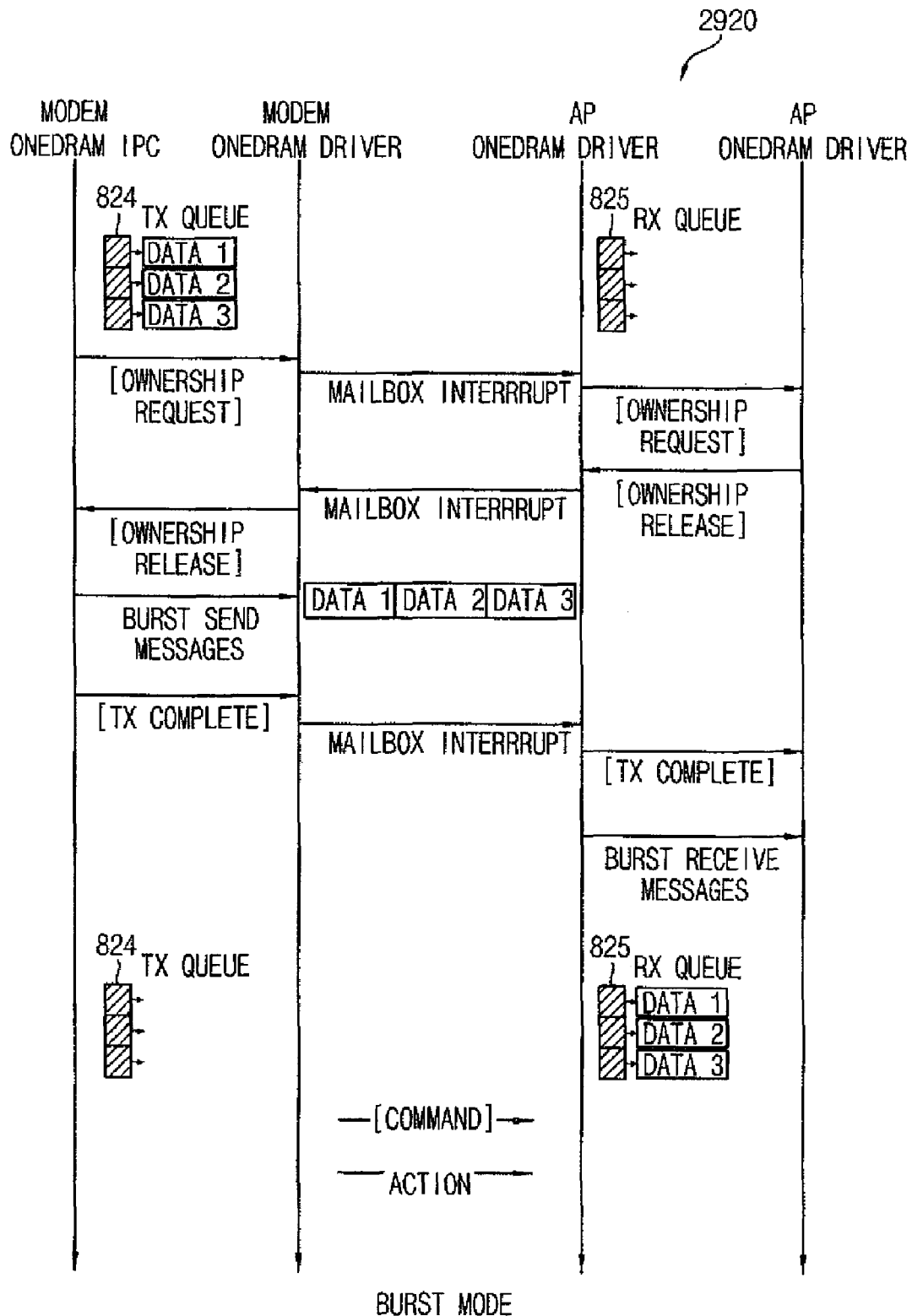

Turning to FIG. 29, comparative methods for single mode versus burst mode are indicated generally by the reference numeral 2900. Here, a single packet mode method 2910 is compared to a burst mode method 2920.

In the single packet mode method 2910, a modem has a transmit side IPC channel or queue 824 containing three packets. An application processor has a receive side IPC channel or queue 825 that is empty. The modem writes an ownership request command to the first mailbox on the IPC device, and the IPC device sends a mailbox interrupt to the application processor. The application processor, in turn, reads the ownership request command from the first mailbox and writes an ownership release command to the second mailbox. The IPC device sends a mailbox interrupt to the modem. The modem reads the ownership release command from the second mailbox.

Next, the modem writes one data packet to a channel of a shared bank on the IPC device, and then writes a transmit complete command to the first mailbox. The IPC device sends a mailbox interrupt to the application processor. The application processor reads the transmit complete command from the first mailbox, and then reads the data packet from the channel on the IPC device to the second processor's receive side IPC channel or queue 825. Thus, the modem now has a transmit side IPC channel 824 containing two packets, while the application processor has a receive side IPC channel or queue 825 containing the transferred packet.

To transfer the second packet, the modem writes an ownership request command to the first mailbox on the IPC device, and the IPC device sends a mailbox interrupt to the application processor. The application processor, in turn, reads the ownership request command from the first mailbox and writes an ownership release command to the second mailbox. The IPC device sends a mailbox interrupt to the modem. The modem reads the ownership release command from the second mailbox.

Next, the modem writes one more data packet to the channel of the shared bank on the IPC device, and then writes a transmit complete command to the first mailbox. The IPC device sends a mailbox interrupt to the application processor. The application processor reads the transmit complete command from the first mailbox, and then reads the data packet from the channel on the IPC device to the second processor's receive side IPC channel or queue 825. Thus, the modem now has a transmit side IPC channel 824 with one packet remaining, while the application processor has a receive side IPC channel or queue 825 containing a total of two transferred packets.

To transfer the third packet, the modem writes another ownership request command to the first mailbox on the IPC device, and the IPC device sends a mailbox interrupt to the application processor. The application processor, in turn, reads the ownership request command from the first mailbox and writes an ownership release command to the second mailbox. The IPC device sends a mailbox interrupt to the modem. The modem reads the ownership release command from the second mailbox.

Next, the modem writes the third and final data packet to a channel of a shared bank on the IPC device, and then writes a transmit complete command to the first mailbox. The IPC device sends a mailbox interrupt to the application processor. The application processor reads the transmit complete command from the first mailbox, and then reads the data packet from the channel on the IPC device to the second processor's receive side IPC channel or queue 825 Thus, the modem has now emptied its transmit side IPC channel 824, while the application processor has a receive side IPC channel or queue 825 containing all three transferred packets.

In the burst mode method 2920, the modem begins with a transmit side IPC channel or queue 824 containing three packets, and the application processor begins with a receive side IPC channel or queue 825 that is empty. These are the same starting conditions as for the single mode 2910.

The modem writes an ownership request command to the first mailbox on the IPC device, and the IPC device sends a mailbox interrupt to the application processor. The application processor, in turn, reads the ownership request command from the first mailbox and writes an ownership release command to the second mailbox. The IPC device sends a mailbox interrupt to the modem. The modem reads the ownership release command from the second mailbox.

Next, the modem performs a burst write of all three packets to a channel of a shared bank on the IPC device, and then writes a transmit complete command to the first mailbox. The IPC device sends a mailbox interrupt to the application processor. The application processor reads the transmit complete command from the first mailbox, and then reads all three data packets from the channel on the IPC device to the second processors receive side IPC channel or queue 825. Thus, the modem has now emptied its transmit side IPC channel 824, while the application processor has a receive side IPC channel or queue 825 containing all three packets transferred in the burst mode.

Thus, only one data packet can be transferred at a time in the single mode 2910, while multiple data packets can be transferred at once in the burst mode 2920. Further, the single mode generates more interrupts than the burst mode, which creates additional overhead for the processor. In addition, the use of the burst mode can save the time spent on additional ownership requests in single mode.

Figure 30A:
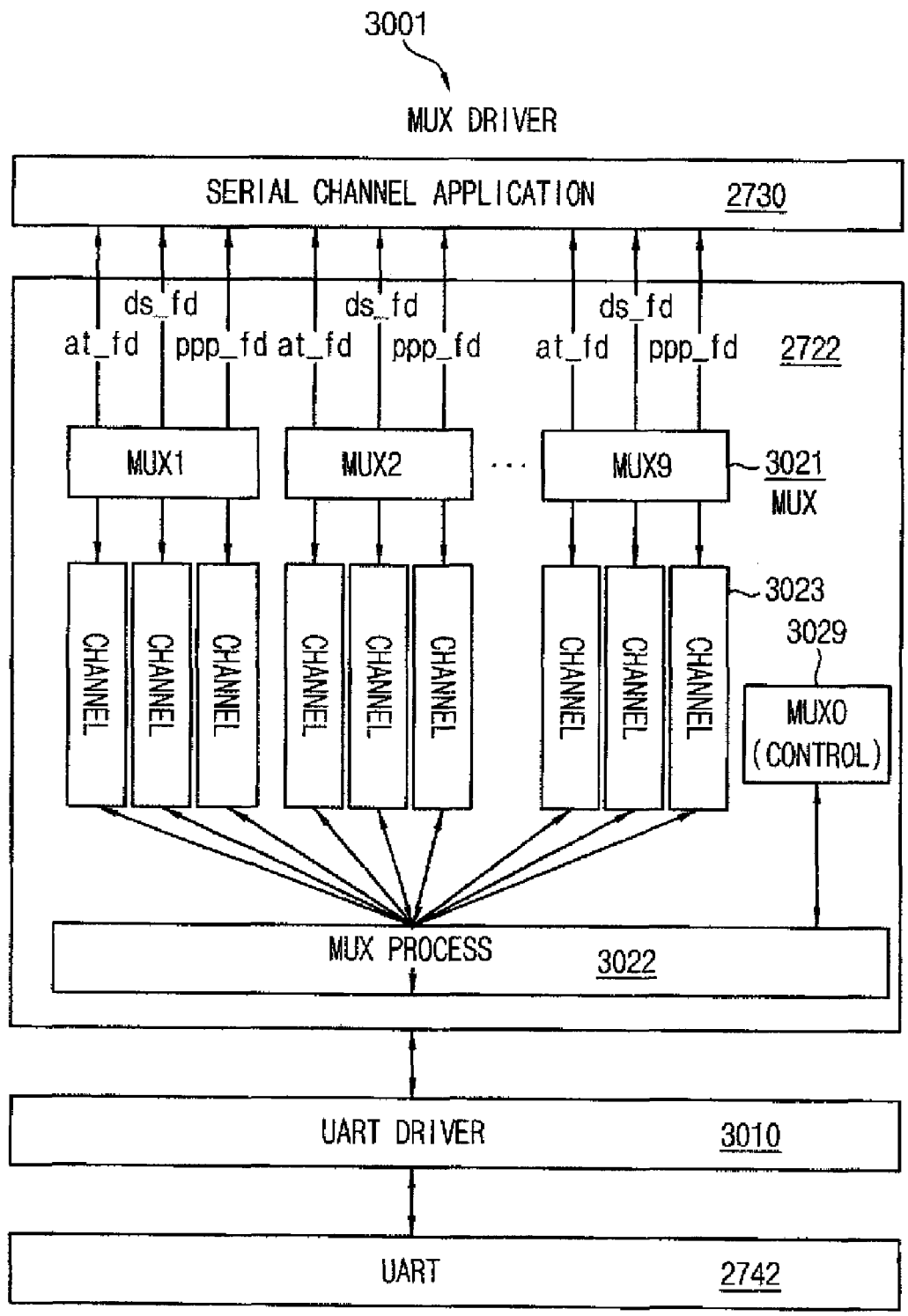
FIG. 30 shows a comparative block diagram for a MUX driver versus a OneDRAM™ IPC driver in accordance with an exemplary embodiment of the present disclosure.
Figure 30B:
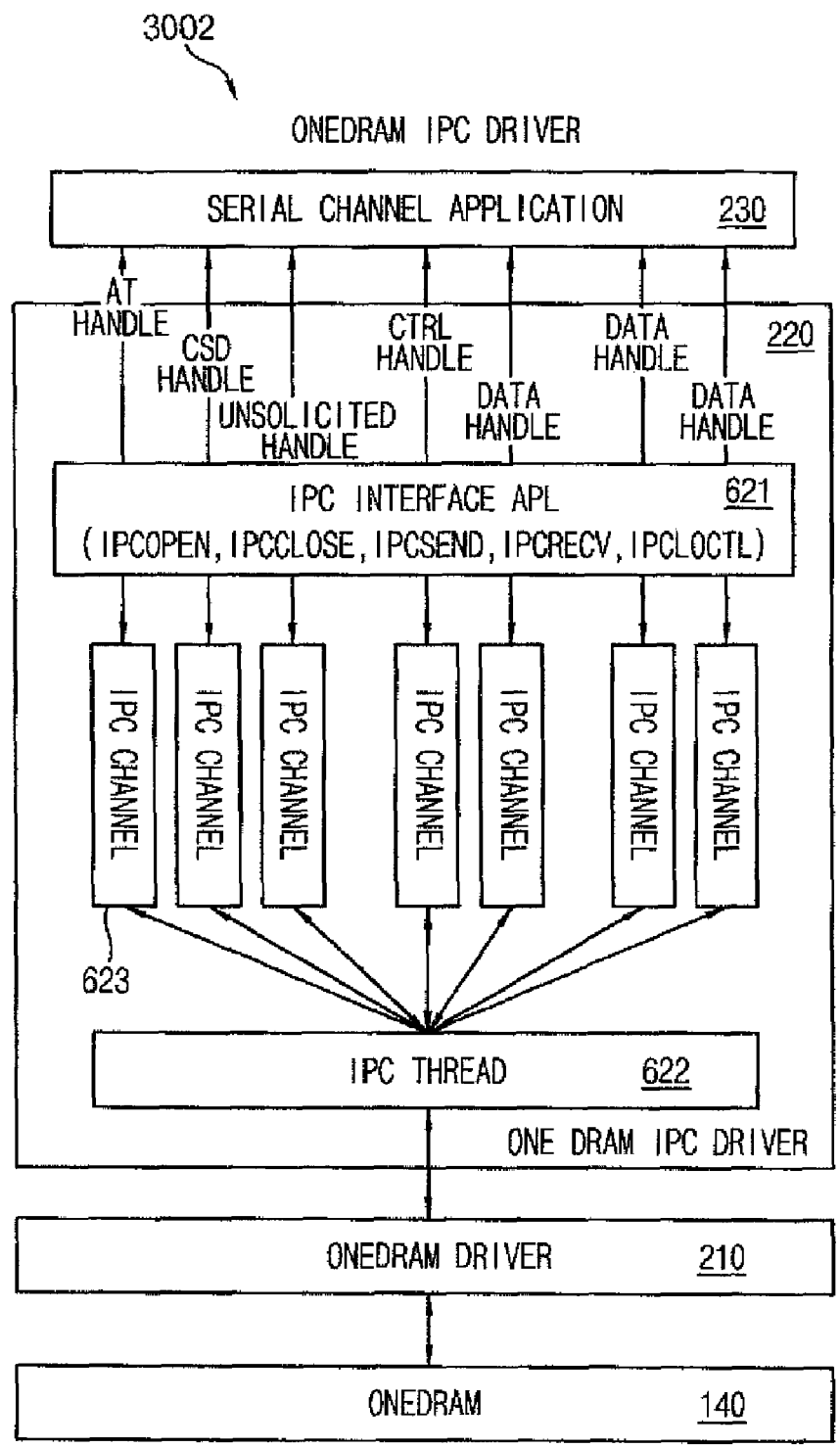

Turning now to FIG. 30, a system comparison of a MUX driver versus an IPC driver is indicated generally by the reference numeral 3000. A MUX driver system 3001 includes a serial channel application 2730 for receiving data from a MUX driver 2722. The MUX driver 2722 is in signal communication with a UART driver 3010, which, in turn, is in signal communication with a UART 2742. The MUX driver 2722 includes a plurality of MUX units 3021, each in signal communication with a plurality of MUX channels 3023. The MUX channels, in turn, are all in signal communication with a MUX process 3022, which is in signal communication with MUX driver (MUXD) control unit 3029.

An IPC driver system 3002 includes a serial channel application 230 for receiving data from an IPC driver 220, both introduced in FIG. 2. The IPC driver 220 is in signal communication with a device driver 210, which, in turn, is in signal communication with an IPC device 140. Here, the IPC device 140 may be an exemplary OneDRAM™, for example. The IPC driver 220 includes an IPC interface API 621 in signal communication with a plurality of IPC channels 623, all as introduced in FIG. 6. The plurality of channels, in turn, are all in signal communication with an IPC thread 622.

The IPC driver 220 supports multiple channels, and its IPC interface API 621 is used in the upper layer to control the IPC channels. As introduced in the table 700 of FIG. 7, functions supported by the IPC interface API include ipcOpen, ipcClose, ipcSend, ipcRecv, ipcIoctl, and the like. Thus, each IPC channel is configurable, and has a TX/RX message queue for buffering data. The IPC channel handles the data as packets. Just one IPC thread manages all of the IPC channels. The IPC thread operations include sending messages, receiving messages, and interpreting IPC control commands. The OneDRAM™ device driver 210 provides interface functions to manage and control a OneDRAM™ IPC device 140.

Figure 31:
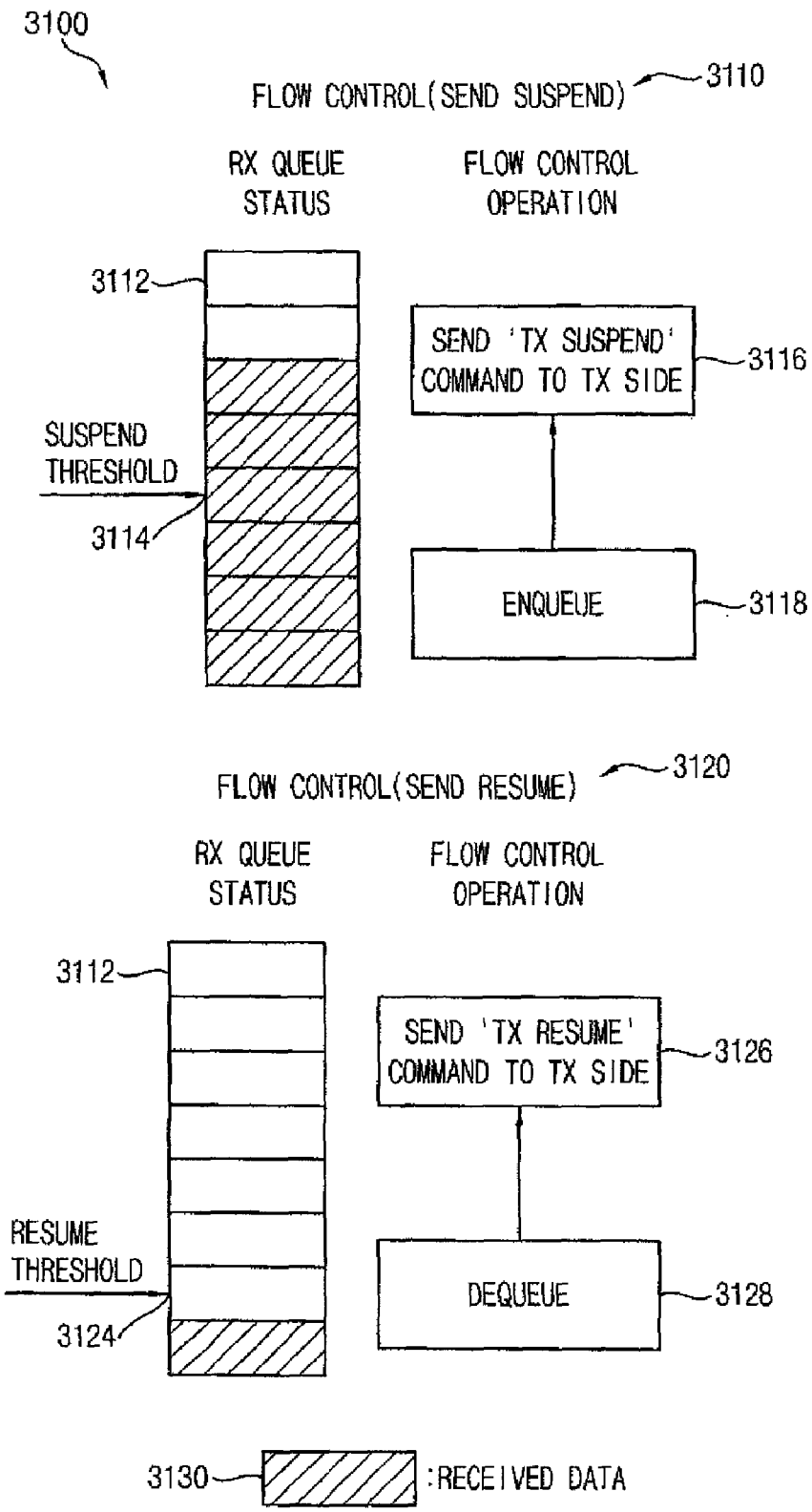
FIG. 31 shows a schematic block diagram for flow control using receive buffer thresholds in accordance with an exemplary embodiment of the present disclosure.

As shown in FIG. 31, a method of flow control using receive buffer thresholds is indicated generally by the reference numeral 3100. In flow control for a send suspend operation 31101 a receive (RX) queue 3112 contains a number of data packets that exceeds its suspend threshold 3114. Thus, in a function block 3118, the IPC driver performs an enqueues the data, and transfers control to another function block 3116. In the function block 3116, the IPC driver sends a transmission suspend command to the transmit (TX) side.

In flow control for a send resume operation 3120, the receive queue 3122 contains a number of data packets that is less than a resume threshold 3124. Thus, in a function block

3128, the IPC driver dequeues the data, and passes control to another function block 3126. In the function block 3126, the IPC driver sends a transmission resume command to the transmit side. The TX side may now transmit a new data packet 3130 to be received by the RX side.

Thus, the receive buffer queue threshold is used for flow control in the receive side's IPC driver, which suspends the sending operation if the number of received packet buffers is greater than the RX queue suspend threshold, and sends the 'TX Suspend' command to IPC driver on transmit side to make sure that the TX side does not send any more packets.

The RX side's IPC driver orders resumption of the sending operation if the number of received buffers is less than the RX queue resume threshold by sending the 'TX Resume' command to TX side to permit the TX side to send more packets.

Figure 32:
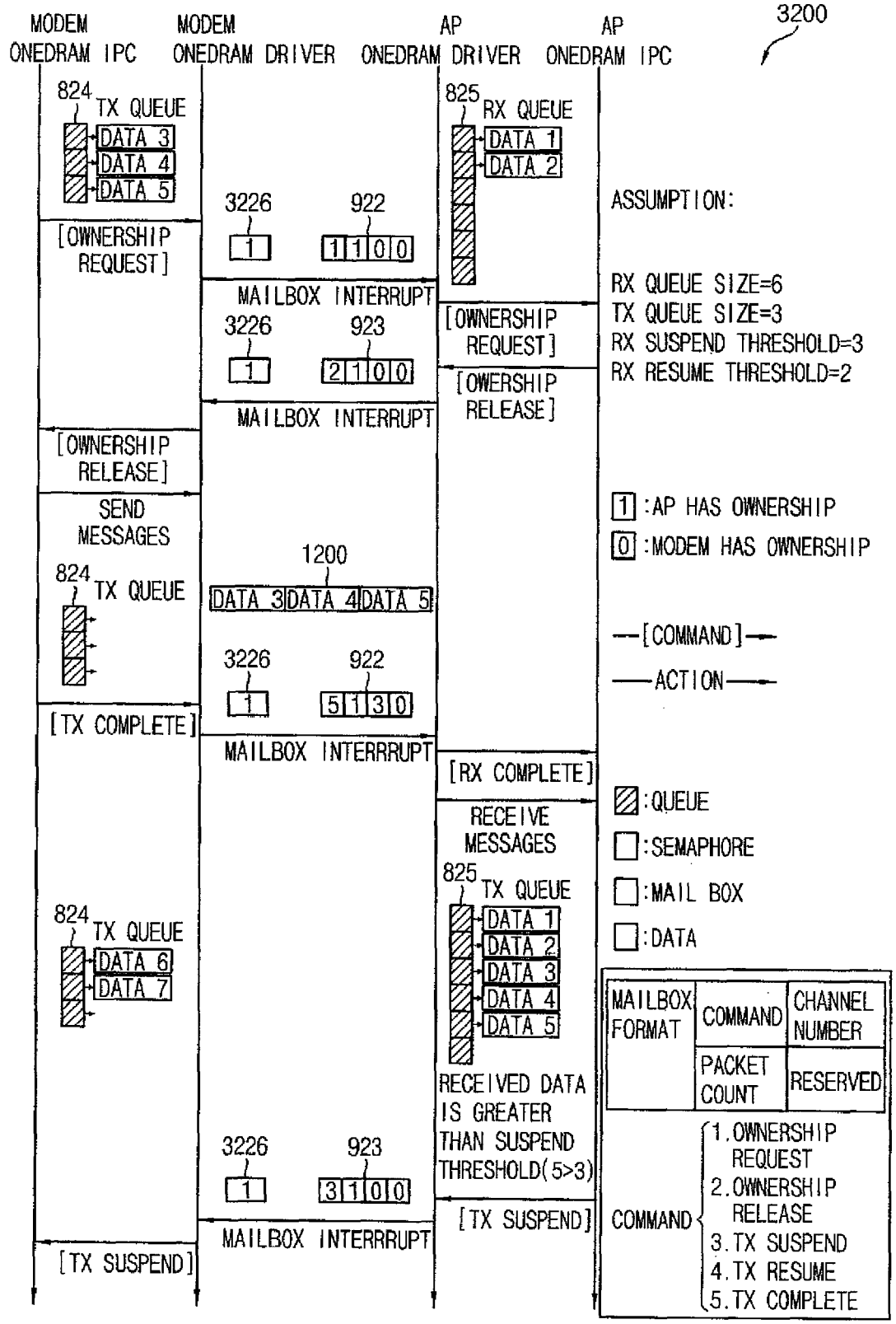
FIG. 32 shows a schematic hybrid diagram for a flow control example with send suspend in accordance with an exemplary embodiment of the present disclosure.

Turning to FIG. 32, a method for flow control example with send suspend is indicated generally by the reference numeral 3200. In the method 3200, the receive (RX) queue size is 6, the transmit (TX) queue size is 3, the RX suspend threshold is 3, and the RX resume threshold is 2. A semaphore value of 0x01 means that the application processor (AP) has ownership of the shared bank, while a semaphore value of 0x00 means that the modem has ownership of the shared bank. The mailbox format 1310 and commands 1350 are those of FIG. 13.

Here, the modem begins with a transmit side IPC channel or queue 824 containing three packets, and the application processor begins with a receive side IPC channel or queue 825 containing two packets. The initial semaphore bit value of 0x01 means that the AP currently has ownership.

The modem writes an ownership request command to the first mailbox 922 on the IPC device. The IPC device sends a mailbox interrupt to the application processor. The AP, in turn, reads the ownership request command from the first mailbox. Next, the AP writes an ownership release command to the second mailbox 923, and writes a value of 0x00 to the semaphore bit 3226, giving ownership to the modem.

The modem reads the ownership release command from the second mailbox. Next, the modem performs a burst write of all three packets to a channel 1200 of a shared bank on the IPC device, writes a transmit complete command to the first mailbox 922, and writes a value of 0x01 to the semaphore bit 3226, giving ownership to the AP. The IPC device sends a mailbox interrupt to the application processor The application processor reads the transmit complete command from the first mailbox 922, and then reads all three data packets from the channel on the IPC device to the second processors receive side IPC channel or queue 825. Thus, the modem has transferred the three packets from its TX side IPC channel or queue 824, while the AP has received the additional three packets into its RX side IPC channel or queue 825, and has a total of five packets in the RX queue.

In the meantime, the modem has generated two new packets in its TX queue 824. However, the five packets in the AP's RX queue exceeds its suspend threshold of three packets. Thus, the AP issues a transmit suspend command to the second mailbox 923, maintains ownership of the shared block and does not change the semaphore bit 3226. The IPC device sends a mailbox interrupt to the modem, and the modem reads the TX suspend command from the IPC device.

Figure 33:
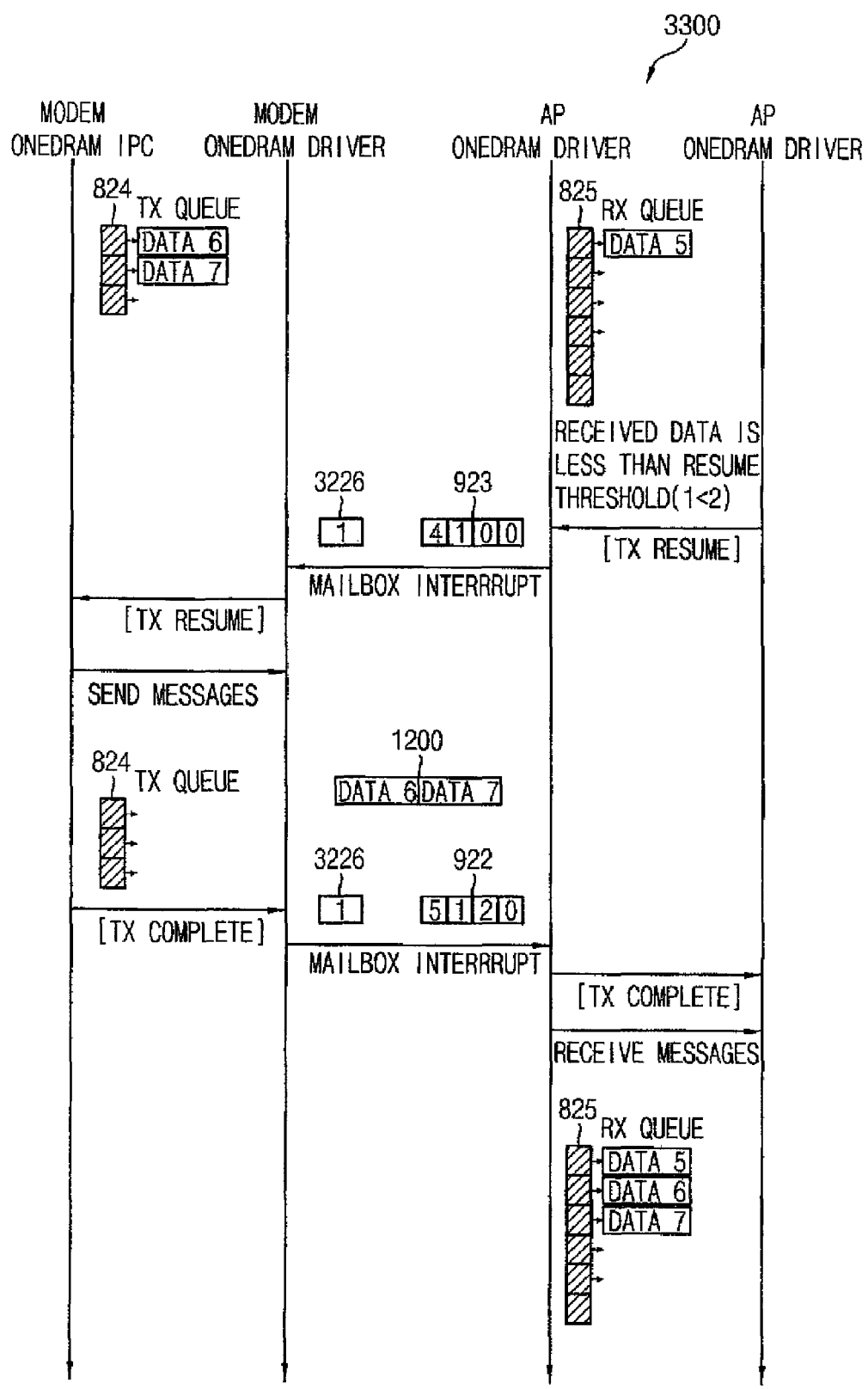
FIG. 33 shows a schematic hybrid diagram for a flow control example with send resume in accordance with an exemplary embodiment of the present disclosure.

Turning now to FIG. 33, a method of flow control with send resume is indicated generally by the reference numeral 3300. The method 3300 picks up where the method 3200 of FIG. 32 ends. Here, the modem has two new data packets in its TX queue 824. The application processor has reduced the number of packets in its RX queue 825 to one packet, which is less than its resume threshold of two packets.

Thus, the AP writes a TX resume command to the second mailbox 923 of the IPC device, and a value of 0x00 to the semaphore bit of the IPC device, transferring ownership to the modem. The IPC device, in turn, issues a mailboxinterrupt to the modem. The modem reads the TX resume command from the second mailbox 923, sends its two data packets to the shared bank channel 1200, writes a TX complete command to the first mailbox 922, and writes a value of 0x01 to the semaphore bit, transferring ownership back to the AP. The IPC device issues a mailbox interrupt to the AP. The AP, in turn, receives the TX complete command from the first mailbox 922, and receives the two new message packets from the shared bank channel 1200, increasing the number of packets in its RX queue to three.

Thus, embodiments of the present disclosure feature multiple channels, efficient flow control, a minimized number of memory copy operations, and burst send and receive operations. A plurality of channels may be provided for two or more processors, and support multiple processes per processor. IPC drivers of the present disclosure use pointer operations rather than copy operations, and fully support burst transfer modes. For example, HSDPA requirements may be easily satisfied by embodiments using burst modes with a length of 20 packets.

Alternate embodiments are contemplated. For example, mailboxes and/or semaphores may be implemented in software rather than hardware. Ownership of individual channels may be accomplished with additional semaphores and/or an increased number of bits per semaphore. In addition, parallel channel communications for transmit and receive channels with different ownerships can be implemented.

Although illustrative embodiments have been described herein with reference to the accompanying drawings, it is to be understood that the present disclosure is not limited to those precise embodiments, and that various other changes and modifications may be effected therein by those of ordinary skill in the pertinent art without departing from the scope or spirit of the present disclosure. All such changes and modifications are intended to be included within the scope of the present disclosure as set forth in the appended claims.

What is claimed is:

1. A multipath-accessible memory device comprising:
N input/output ports, each disposed for connection to one of N processors, wherein N is a real number greater than one;
at least one channel buffer per each of the N processors, each disposed for storing a plurality M of data packets to be transferred from one processor to another one processor, wherein M is a real number greater than one;
a shared memory bank connected in read/write communication to each of the N ports;
a plurality of N(N−1) mailboxes, each mailbox connected in read communication to one of the N ports and dedicated for receiving shared memory access command messages from one of the N processors;
a semaphore area for storing N(N−1)/2 bits, each bit being connected in read communication to one of the N ports and connected in selectable write communication to a different one of the N ports, the N(N−1)/2 bits being indicative of the currently negotiated access to the shared memory region,
wherein the shared memory bank includes the at least one channel buffer per each processor, and each of the at least one channel buffer is disposed for storing a plurality M of data packets to be transferred in a burst mode, and wherein each of the mailboxes is configured to store:
bits of a channel index field indicating an active channel buffer; and bits of a packet count field corresponding to a count of the data packets stored the active channel buffer and to be transferred from one processor corresponding to a first mailbox to another one processor corresponding to a second mailbox.

2. The device of claim 1, the at least one channel buffer includes a transmit channel buffer disposed for storing a first plurality M of data packets to be transferred from one processor and a receive channel buffer for storing a second plurality M of data packets to be received from another one processor.

3. The device of claim 2 wherein one of the transmit channel buffer and the receive channel buffer is configured to store more than M data packets to be transferred to/from its dedicated processor.

4. The device of claim 1 wherein the number N is two, the number of the plurality of input/output ports is two, and the number of the plurality of mailboxes is two.

5. The device of claim 4 wherein:
a first port among the two ports is connected to a first processor among the two processors;
a second port among the two ports is connected to a second processor among the two processors;
the shared memory bank including two channel buffers is configured to be accessed selectively by the first processor or the second processor, and configured to store a plurality of data packets to be transferred between the first processor and the second processor in a selected one of the two channel buffers; and
the two mailboxes are configured to store command and data information for the plurality of data packets to be transferred between the first processor and the second processor.

6. The device of claim 1, each of the N(N−1) mailboxes is configured to further store:
bits of a command field.

7. The device of claim 1, wherein each of the N(N−1) mailboxes has an interrupt generator configured for interrupting a predetermined one of the N processors when the mailbox has been updated by another one of the N processors.

8. The device of claim 1 wherein the at least one channel buffer is configured to store bits of a first field of each data packet indicating the actual amount of data in that data packet.

9. The device of claim 1, further comprising at least one unshared memory bank connected in read/write communication to one of the N ports.

10. The device of claim 1 wherein the shared memory bank is constituted by a plurality of DRAM memory cells disposed in matrix of rows and columns.

11. A method of sharing multipath-accessible memory between a plurality of processors, the method comprising:
connecting N processors in read/write communication to a same shared memory bank, wherein N is a real number greater than one;
connecting the N processors in read communication to a same semaphore area storing N(N−1)/2 bits;
selectably connecting one of the N processors in write communication to N−1 bits among the N(N−1)/2 bits of the same semaphore area;
exchanging through plurality of mailboxes shared-memory access command messages between two processors for negotiating access to the same shared-memory bank; and
storing in the same semaphore area bits indicative of the currently negotiated access,
wherein the shared-memory bank has a channel relative to each processor, each channel having at least one buffer for transferring a plurality of data packets in a burst mode, and wherein each of the mailboxes is configured to store:
bits of a channel index field indicating an active channel; and
bits of a packet count field corresponding to a count of the data packets stored the active channel and to be transferred from one processor corresponding to a first mailbox to another one processor corresponding to a second mailbox.

12. The method of claim 11, wherein each channel includes a transmit channel buffer and a receive channel buffer.

13. The method of claim 11, further comprising:
connecting a first one of the N processors in write communication with one outgoing mailbox dedicated to that first processor; and
connecting a second one of the plurality of processors in read communication with one incoming mailbox dedicated to that second processor.

14. The method of claim 11 wherein the outgoing mailbox of the first processor is the incoming mailbox of the second processor.

15. The method of claim 11 wherein the number N is two.

16. The method of claim 11, further comprising:
a first processor among the N processors acquiring ownership of the shared memory bank;
the first processor writing at least one data packet to the shared memory bank;
wherein exchanging shared-memory access command messages between two processors comprises:
the first processor writing a data transfer command and data transfer information to the mailbox of a second processor;
the second processor reading the data transfer command and data transfer information from its mailbox; and
the second processor reading the at least one data packet from the channel buffer in shared memory bank indicated by the bits of a channel index field stored in its mailbox,
wherein each of the mailboxes is configured to store:
bits of a channel index field indicating an active channel buffer; and
bits of a packet count field corresponding to a count of the data packets stored the active channel buffer and to be transferred from one processor corresponding to a first mailbox to another one processor corresponding to a second mailbox.

17. A mobile communications device comprising:
N processors, wherein N is a real number greater than one;
N input/output ports, each disposed for connection to one of the N processors;
a shared memory bank connected in read/write communication to each of the N ports;
a plurality of N(N−1) mailboxes, each connected in read communication to one of the N ports for receiving shared-memory access command messages from other processors;
a semaphore area for storing N(N−1)/2 bits each bit being connected in read communication to one of the N ports and connected in selectable write communication to a different one of the N ports, the N(N−1)/2 bits being indicative of the currently negotiated access to the shared memory bank,
wherein the shared memory bank includes the at least one channel buffer per each processor, and each of the at least one channel buffer is disposed for transferring a plurality of data packets in a burst mode, and wherein each of the mailboxes is configured to store:

bits of a channel index field indicating an active channel buffer; and bits of a packet count field corresponding to a count of the data packets stored the active channel buffer and to be transferred from one processor corresponding to a first mailbox to another one processor corresponding to a second mailbox.

18. A mobile communications apparatus comprising:

a first processor;

at least one second processor; and a multipath-accessible memory configured to transfer a plurality of data packets between the first and at least one second processors;

wherein the multipath-accessible memory includes a plurality of channel buffers configured to be selectively accessed by the first or at least one second processors and includes a plurality of mailboxes configured to store command and data transit information for transferring the plurality of data packets between the processors through the channel buffers, and wherein each of the mailboxes is configured to store:

bits of a channel index field indicating an active channel buffer; and bits of a packet count field corresponding to a count of the data packets stored the active channel buffer and to be transferred from one processor corresponding to a first mailbox to another one processor corresponding to a second mailbox.

19. The apparatus of claim 18, each processor configured to execute code implementing:

an inter-processor communications driver; and a device driver connected in signal communication with the inter-processor communications driver.

20. The apparatus of claim 19 wherein each device driver supports an application programming interface (API), each API configured to read or write command information to the mailboxes and to read or write a plurality of data packets into the channel buffers in accordance with the command information.

21. The apparatus of claim 20 wherein the command information is written by one processor to the mailbox associated with the port of the other processor.

22. The apparatus of claim 18, the multipath-accessible memory comprising:

a plurality of input/output ports, each disposed for connection to one of the processors;

a shared memory region connected in read/write communication to each of the plurality of ports;

a plurality of mailboxes, each mailbox connected in read communication to one of the plurality of ports for receiving shared memory access command messages from other processors;

a semaphore area connected in read communication to each of the plurality of ports and connected in selectable write communication to one of the plurality of ports for storing bits indicative of the currently negotiated access to the shared memory region, wherein the shared memory region has at least one channel buffer relative to each processor for transmitting and receiving a plurality of data packets in a burst mode, and wherein each of the mailboxes is configured to store:

bits of a channel index field indicating an active channel buffer; and bits of a packet count field corresponding to a count of the data packets stored the active channel buffer and to be transferred from one processor corresponding to a first mailbox to another one processor corresponding to a second mailbox.

\* \* \* \* \*